United States Patent
Bloch et al.

(10) Patent No.: US 11,810,304 B1
(45) Date of Patent: *Nov. 7, 2023

(54) PERSPECTIVE DISTORTION CORRECTION OF DISCRETE OPTICAL PATTERNS IN IMAGES USING DEPTH SENSING

(71) Applicant: Scandit AG, Zürich (CH)

(72) Inventors: Matthias Bloch, Zürich (CH); Christian Floerkemeier, Zürich (CH); Bernd Schoner, New York, NY (US)

(73) Assignee: Scandit AG, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,253

(22) Filed: Jul. 12, 2022

Related U.S. Application Data

(63) Continuation of application No. 17/385,604, filed on Jul. 26, 2021, now Pat. No. 11,417,001.

(Continued)

(51) Int. Cl.
*G06T 7/194* (2017.01)
*G06T 7/521* (2017.01)
(Continued)

(52) U.S. Cl.
CPC ............ *G06T 7/194* (2017.01); *G01S 17/894* (2020.01); *G06K 7/10722* (2013.01);
(Continued)

(58) Field of Classification Search
CPC ....... G06T 7/194; G06T 7/521; G01S 17/894; G06K 7/10722; G06K 7/1413; G06K 9/3258; G06K 9/34; G06K 2209/01
See application file for complete search history.

(56) References Cited

U.S. PATENT DOCUMENTS

| | | |
|---|---|---|
| 4,167,756 A | 9/1979 | Smith |
| D344,261 S | 2/1994 | Watanabe |

(Continued)

FOREIGN PATENT DOCUMENTS

| | | |
|---|---|---|
| EP | 3167404 A1 | 5/2017 |
| JP | 2004032507 A | 1/2004 |

(Continued)

OTHER PUBLICATIONS

Scandit, "Scandit Augmented Reality Retail Price Label Verification", posted Sep. 26, 2018, retrieved on Aug. 4, 2020 from https://www.scandit.com/resources/videos/scandit-augmented-reality-retail-price-label-verification/ , 5 pages.

(Continued)

*Primary Examiner* — David F Dunphy
(74) *Attorney, Agent, or Firm* — KILPATRICK TOWNSEND & STOCKTON LLP

(57) ABSTRACT

Depth information from a depth sensor, such as a LiDAR system, is used to correct perspective distortion for decoding an optical pattern in a first image acquired by a camera. Image data from the first image is spatially correlated with the depth information. The depth information is used to identify a surface in the scene and to distort the first image to generate a second image, such that the surface in the second image is parallel to an image plane of the second image. The second image is then analyzed to decode an optical pattern on the surface identified in the scene.

20 Claims, 14 Drawing Sheets

Related U.S. Application Data

(60) Provisional application No. 63/057,135, filed on Jul. 27, 2020.

(51) Int. Cl.
| | | |
|---|---|---|
| *G06K 7/10* | (2006.01) | |
| *G06K 9/00* | (2022.01) | |
| *G01S 17/894* | (2020.01) | |
| *G06K 7/14* | (2006.01) | |
| *G06V 10/26* | (2022.01) | |
| *G06V 20/62* | (2022.01) | |
| *G06V 30/10* | (2022.01) | |

(52) U.S. Cl.
CPC ............ *G06K 7/1413* (2013.01); *G06T 7/521* (2017.01); *G06V 10/26* (2022.01); *G06V 20/63* (2022.01); *G06V 30/10* (2022.01)

(56) References Cited

U.S. PATENT DOCUMENTS

| | | |
|---|---|---|
| 5,744,815 A | 4/1998 | Gurevich et al. |
| D473,872 S | 4/2003 | Ausems et al. |
| 6,580,453 B1 | 6/2003 | Hirasawa |
| D576,197 S | 9/2008 | Takagi |
| 7,457,407 B2 | 11/2008 | Sun et al. |
| D654,931 S | 2/2012 | Lemelman et al. |
| D658,174 S | 4/2012 | Tasselli et al. |
| D659,564 S | 5/2012 | Baxter |
| 8,223,203 B2 | 7/2012 | Ohsumi et al. |
| D667,823 S | 9/2012 | Merenda |
| D670,278 S | 11/2012 | Hamann |
| D672,386 S | 12/2012 | Matunuma et al. |
| D678,870 S | 3/2013 | Fathollahi |
| D678,936 S | 3/2013 | Oliver |
| D685,360 S | 7/2013 | Chen et al. |
| D688,654 S | 8/2013 | Stevinson |
| 8,596,540 B2 | 12/2013 | Adelmann |
| D698,772 S | 2/2014 | Merenda |
| D710,343 S | 8/2014 | Chandler, Jr. et al. |
| D710,346 S | 8/2014 | Smith et al. |
| 8,798,453 B2 | 8/2014 | Lawton |
| D716,285 S | 10/2014 | Chaney et al. |
| D716,785 S | 11/2014 | White |
| D717,287 S | 11/2014 | Macrina et al. |
| D717,304 S | 11/2014 | Yturralde et al. |
| D719,166 S | 12/2014 | Brown et al. |
| D719,167 S | 12/2014 | Brown et al. |
| D726,701 S | 4/2015 | Stevinson |
| 9,019,420 B2 | 4/2015 | Hurst et al. |
| D724,573 S | 5/2015 | Stevinson |
| D728,551 S | 5/2015 | Saeki et al. |
| D732,011 S | 6/2015 | Stevinson |
| D733,112 S | 6/2015 | Chaney et al. |
| D734,336 S | 7/2015 | Mistkawi et al. |
| D744,470 S | 12/2015 | Stevinson |
| D748,085 S | 1/2016 | Merenda |
| D754,114 S | 4/2016 | Curtis et al. |
| D754,650 S | 4/2016 | Curtis et al. |
| D759,004 S | 6/2016 | Stevinson |
| D760,209 S | 6/2016 | Weng et al. |
| D760,212 S | 6/2016 | Mao et al. |
| D760,710 S | 7/2016 | Ozolins et al. |
| D761,240 S | 7/2016 | Ozolins et al. |
| D768,617 S | 10/2016 | Merenda |
| D771,631 S | 11/2016 | Fitch et al. |
| 9,654,675 B2 | 5/2017 | Kessler |
| 9,836,635 B2 | 12/2017 | Negro et al. |
| 10,191,242 B2 | 1/2019 | Palmeri |
| 10,200,599 B1 | 2/2019 | Baldwin |
| 10,229,301 B2 | 3/2019 | Cumoli et al. |
| D860,180 S | 9/2019 | Lehmann et al. |
| D862,441 S | 10/2019 | Eppler et al. |
| 10,426,442 B1 | 10/2019 | Schnorr |
| 10,452,959 B1 | 10/2019 | Gautam et al. |
| 10,818,014 B2 | 10/2020 | Xu et al. |
| 10,846,561 B1 | 11/2020 | Floerkemeier et al. |
| 10,963,658 B1 | 3/2021 | Bloch et al. |
| 11,087,105 B1 | 8/2021 | Biasini et al. |
| 11,216,628 B2 | 1/2022 | Scherly et al. |
| 11,244,147 B2 | 2/2022 | Floerkemeier et al. |
| 2003/0059124 A1 | 3/2003 | Center, Jr. |
| 2006/0011724 A1 | 1/2006 | Joseph et al. |
| 2006/0249581 A1 | 11/2006 | Smith |
| 2007/0116454 A1 | 5/2007 | Tsai |
| 2009/0002797 A1 | 1/2009 | Kwong et al. |
| 2009/0033786 A1 | 2/2009 | Finkelstein et al. |
| 2009/0108071 A1 | 4/2009 | Carlson |
| 2009/0212113 A1 | 8/2009 | Chiu et al. |
| 2009/0304234 A1 | 12/2009 | Kondo et al. |
| 2010/0102129 A1 | 4/2010 | Drzymala et al. |
| 2010/0328420 A1 | 12/2010 | Roman |
| 2011/0007205 A1 | 1/2011 | Lee |
| 2011/0043683 A1 | 2/2011 | Beach et al. |
| 2011/0081946 A1 | 4/2011 | Singh |
| 2011/0168776 A1 | 7/2011 | Jalali et al. |
| 2013/0076697 A1 | 3/2013 | Goertz et al. |
| 2013/0112750 A1 | 5/2013 | Negro et al. |
| 2013/0206839 A1 | 8/2013 | Gao |
| 2013/0329115 A1 | 12/2013 | Palmeri |
| 2014/0025973 A1 | 1/2014 | Schillings et al. |
| 2014/0168468 A1 | 6/2014 | Levoy et al. |
| 2014/0171150 A1 | 6/2014 | Hurst et al. |
| 2014/0232930 A1 | 8/2014 | Anderson |
| 2014/0247278 A1 | 9/2014 | Samara et al. |
| 2014/0285913 A1 | 9/2014 | Palmeri |
| 2014/0327815 A1 | 11/2014 | Auger |
| 2015/0048167 A1 | 2/2015 | Russell et al. |
| 2015/0053765 A1 | 2/2015 | Powell et al. |
| 2015/0093015 A1* | 4/2015 | Liang ................. G06F 18/24 382/154 |
| 2015/0116547 A1 | 4/2015 | Laroia |
| 2015/0220766 A1 | 8/2015 | Russell et al. |
| 2016/0070944 A1 | 3/2016 | McCloskey et al. |
| 2016/0077307 A1 | 3/2016 | Palmeri |
| 2016/0104021 A1 | 4/2016 | Negro et al. |
| 2016/0188941 A1 | 6/2016 | Todeschini et al. |
| 2016/0253599 A1 | 9/2016 | Lang et al. |
| 2016/0307006 A1 | 10/2016 | Wang |
| 2016/0321819 A1 | 11/2016 | Morgan-Mar et al. |
| 2016/0323508 A1 | 11/2016 | Ayalasomayajula et al. |
| 2017/0013179 A1 | 1/2017 | Kang et al. |
| 2017/0032311 A1 | 2/2017 | Rizzolo et al. |
| 2017/0041540 A1 | 2/2017 | Foster et al. |
| 2017/0243097 A1 | 8/2017 | Loy et al. |
| 2017/0278289 A1* | 9/2017 | Marino ................. G06T 7/536 |
| 2018/0081417 A1 | 3/2018 | Chan et al. |
| 2018/0137319 A1 | 5/2018 | Giordano et al. |
| 2018/0157885 A1 | 6/2018 | Gurzumar |
| 2018/0342050 A1 | 11/2018 | Fitzgerald et al. |
| 2019/0065803 A1 | 2/2019 | Burke et al. |
| 2019/0188435 A1 | 6/2019 | Davis et al. |
| 2019/0244043 A1 | 8/2019 | Bradley et al. |
| 2019/0325183 A1 | 10/2019 | Tscherepanow et al. |
| 2020/0042803 A1 | 2/2020 | Yamaguchi |
| 2020/0084375 A1 | 3/2020 | Tadano et al. |
| 2021/0125141 A1 | 4/2021 | Lipsey et al. |
| 2021/0158278 A1* | 5/2021 | Bogolea ................ G06T 7/0008 |

FOREIGN PATENT DOCUMENTS

| | | |
|---|---|---|
| KR | 20020077090 A | 10/2002 |
| KR | 20060102957 A | 9/2006 |
| WO | 0131893 A1 | 5/2001 |
| WO | 2016007662 A1 | 1/2016 |
| WO | 2019-135163 A2 | 7/2019 |
| WO | 2021-202762 A1 | 10/2021 |

OTHER PUBLICATIONS

Scandit, "Scandit Augmented Reality for Smart Devices", posted Oct. 2, 2019, retrieved on Dec. 2, 2020 from https://www.scandit.

(56) References Cited

OTHER PUBLICATIONS com/resources/videos/scandit-augmented-reality-for-smart-devices/, 3 pages.
Scandit, "Scandit Augmented Retail Product Information Using AR", posted Sep. 26, 2018, retrieved on Dec. 2, 2020 from https://www.scandit.com/resources/videos/scandt-augmented-retail-product-information-using-ar/, 5 pages.
Scandit, "Scandit Augmented Reality Retail Click and Collect", posted Sep. 26, 2018, retrieved on Dec. 2, 2020 from https://www.scandit.com/resources/videos/scandit-augmented-reality-retail-click-and-collect/, 4 pages.
Scandit, "Scandit Augmented Reality Retail Shelf Management", posted Sep. 26, 2018, retrieved on Dec. 2, 2020 from https://www.scandit.com/resources/videos/scandit-augmented-reality-retail-shelf-management/, 4 pages.
Scandit, "Computer Vision and Augmented Reality for Enterprise Applications", posted Jun. 6, 2018, retrieved on Dec. 2, 2020 from https://www.scandit.com/resources/videos/computer-vision-and-augmented-reality-for-enterprise-applications/, 2 pages.
"Code Reader 4405 User Manual", Code Product Line Version 03, Release date: Jan. 2016,. Code Corporation, Accessed on: Dec. 22, 2020 [Online]. Retrieved from: https://web.archive.org/web/20181223184651/http://www.codecorp.com/products.php?id=167, 16 pages.
"Flens—The First Flashlight Booster for Smartphones", created by Basilico, Kickstarter, last updated Dec. 11, 2019, Accessed on Mar. 26, 2021 from https://kickstarter.com/projects/basilico/flen-the-flrst-flashlight-booster-for-smartphones, 26 pages.
"Linea Pro Extreme Rugged Case". Infinite Peripherals, iOS Accessories, Linea Pro and Infinea Tab Accessories, Retrieved on Dec. 22, 2020 from https://web.archive.org/web/201508250443544/http://ipcprint.com/linea-pro-extreme-rugged-case.html 3 page.
Brownlee; Jason, "Deep Learning Models for Human Activity Recognition", Deep Learning for Time Series, Navigation, last updated Aug. 5, 2019, 16 pages.
Pre-interview First Office Action dated Sep. 16, 2020 in U.S. Appl. No. 16/920,061, 6 pages.
Notice of Allowance dated Aug. 5, 2020 in U.S. Appl. No. 16/905, 19 pages.
Notice of Allowance dated Dec. 2, 2020 in U.S. Appl. No. 16/920,061, 14 pages.
Non-Final Office Action dated Dec. 2, 2021 in U.S. Appl. No. 17/396,123, 6 pages.
International Search Report and Written Opinion for PCT/US2021/025212 dated Aug. 12, 2021, all pages.

* cited by examiner

US 11,810,304 B1

PERSPECTIVE DISTORTION CORRECTION OF DISCRETE OPTICAL PATTERNS IN IMAGES USING DEPTH SENSING

CROSS REFERENCE TO RELATED APPLICATIONS

This application is a continuation of U.S. patent application Ser. No. 17/385,604, filed on Jul. 26, 2021, entitled "Detecting Discrete Optical Patterns Using Depth Estimation," which application claims priority to U.S. Provisional Application No. 63/057,135, filed on Jul. 27, 2020. These applications are incorporated by reference for all purposes.

BACKGROUND

This disclosure generally relates to decoding optical patterns in a scene or image, and more specifically, and without limitation, to decoding barcodes. Barcodes have traditionally been scanned using a specialized scanner. For example, a barcode scanner comprising a laser is used to shine light on a barcode and reflected light from the barcode is detected and used to decode the barcode. As mobile devices (e.g., smartphones and tablets) with cameras have become more common, mobile devices are being used to decode codes by acquiring an image of a code and using image analysis to decode the code. An example of a method for using a smartphone to decode a barcode is provided in U.S. Pat. No. 8,596,540, granted on Dec. 3, 2013.

SUMMARY

Embodiments disclosed herein generally, and without limitation, relate to using depth data with image data to detect an optical pattern and/or manipulate an image containing an optical pattern.

In some embodiments, a system for decoding optical patterns in a real scene using semantic image segmentation comprises a camera, a laser-ranging system, and one or more processors. The one or more processors are configured to receive an image of a real scene, wherein the image is acquired by the camera; receive a depth map of the real scene, wherein data for the depth map is acquired by the laser-ranging system; spatially correlate the image with the depth map; segment the image by partitioning the image into one or more foreground segments and one or more background segments, based on data from the depth map; analyze the one or more foreground segments of the image to detect an optical pattern in the one or more foreground segments; and/or decode the optical pattern to obtain a data payload. In some configurations, the optical pattern is a barcode; the optical pattern is text; the camera and the laser-ranging system are part of a hand-held, mobile device; and/or the hand-held, mobile device is a smartphone.

In some embodiments, a method for decoding optical patterns in a real scene using semantic image segmentation comprises: receiving image data from an image of a real scene; receiving a depth map of the real scene, wherein data for the depth map is acquired by a ranging system using a laser; spatially correlating the image data with the depth map; segmenting the image data by partitioning the image data into one or more foreground segments and one or more background segments, based on data from the depth map; analyzing the one or more foreground segments to detect an optical pattern in the one or more foreground segments; and/or decoding the optical pattern to obtain a data payload, after detecting the optical pattern in the one or more foreground segments. In some configurations, the method further comprises: saving the data payload and transmitting the data payload wirelessly to another device; receiving the image data and data for the depth map at a remote server; segmenting the image using the remote server; and/or down sampling an image to obtain the image data.

In some embodiments, a system for modifying a camera parameter for optical decoding comprises a camera, a laser-ranging system, and one or more processors. The one or more processors are configured to: receive an image of a real scene, wherein the image is acquired by the camera; receive a depth map of the real scene, wherein data for the depth map is acquired by the laser-ranging system; spatially correlate the image with the depth map; segment the image by partitioning the image into one or more foreground segments and one or more background segments, based on data from the depth map; and/or modify a camera parameter based on data from the one or more foreground segments. In some configurations the camera parameter is focus, center, magnification, white balance, film speed/ISO, aperture, shutter speed, or contrast of the camera.

In some embodiments, a method for decoding optical patterns in a real scene using perspective distortion comprises: receiving image data from a first image, wherein the first image is of a real scene; receiving a depth map of the real scene, wherein data for the depth map is acquired by a ranging system using a laser; spatially correlating the image data with the depth map; identifying a surface in the real scene using the depth map, wherein the surface corresponds to a feature in the real scene; distorting the first image to generate a second image, so that the surface in the second image is parallel to an image plane of the second image; analyzing the second image to detect an optical pattern in the second image; and/or decoding the optical pattern to obtain a data payload. In some configurations, the feature is a shelf in a retail environment; the surface is a plane; and/or the surface is a curved surface. In some configurations, a method comprises de-blurring the surface in the second image using the depth map; and/or using the depth map of the surface to calculate a homography perspective of a camera with respect to the surface.

In some embodiments, a method for stitching images comprises: receiving first image data from a first image, wherein the first image is of a real scene; receiving second image data from a second image, wherein the second image is of the real scene; receiving a first depth map of the real scene, wherein data for the first depth map is acquired by a ranging system using a laser; receiving a second depth map of the real scene, wherein data for the second depth map is acquired by the ranging system; spatially correlating the first image data with the first depth map; spatially correlating the second image data with the second depth map; identifying a feature in the first image; identifying the feature in the second image; ascertaining a distance to the feature in the first image using the first depth map; ascertaining a distance to the feature in the second image using the second depth map; aligning the first image with the second image in a projection so that the feature in the first image is collocated with the feature in the second image; warping the first image and/or the second image so that in the projection the feature in the first image is a same distance from a center of the projection as the feature in the second image, to generate warped images; and/or stitching the warped images, while the feature is collocated in the warped images.

In some embodiments, a method for decoding an embossed pattern in a real scene using depth information comprises: receiving image data from an image of a real scene; receiving a depth map of the real scene, wherein data for the depth map is acquired by a ranging system using a laser; spatially correlating the image data with the depth map; analyzing the depth map to detect an optical pattern in the real scene; segmenting a portion of the image containing the optical pattern, based on detecting the optical pattern using the depth map; and/or decoding the optical pattern in the portion of the image to obtain a data payload. In some configurations, the optical pattern is a three-dimensional structure of two-dimension information; and/or the optical pattern comprises raised characters on a credit card.

In some embodiments, a method for decoding optical patterns in a real scene using depth information and object outline extraction comprises: receiving image data from an image of a real scene; receiving a depth map of the real scene, wherein data for the depth map is acquired by a ranging system using a laser; spatially correlating the image data with the depth map; detecting an object in the real scene using the depth map; segmenting a portion of the image containing at least a portion of the object; analyzing the portion of the image to detect an optical pattern; and decoding the optical pattern in the portion of the image to obtain a data payload. In some configurations, the object is a mobile device; the object is a hand, and the optical pattern is displayed on a mobile device being held by the hand; the hand is detected by tracking a skeletal representation of human posture in a plurality of preceding depth maps and/or images acquired by the camera and/or ranging system, and identifying the hand from the skeletal representation; the object is an item for purchase, and a dimension of the object is compared to a database to confirm the item for purchase matches a dimension of an object identified by the payload data; and/or the object is piece of luggage, and the dimensions of the object are used to estimate compliance with luggage standards. In some configurations, the method further comprises dimensioning the object using data from the depth map.

BRIEF DESCRIPTION OF THE DRAWINGS

A further understanding of the nature and advantages of various embodiments may be realized by reference to the following figures.

Figure 1:
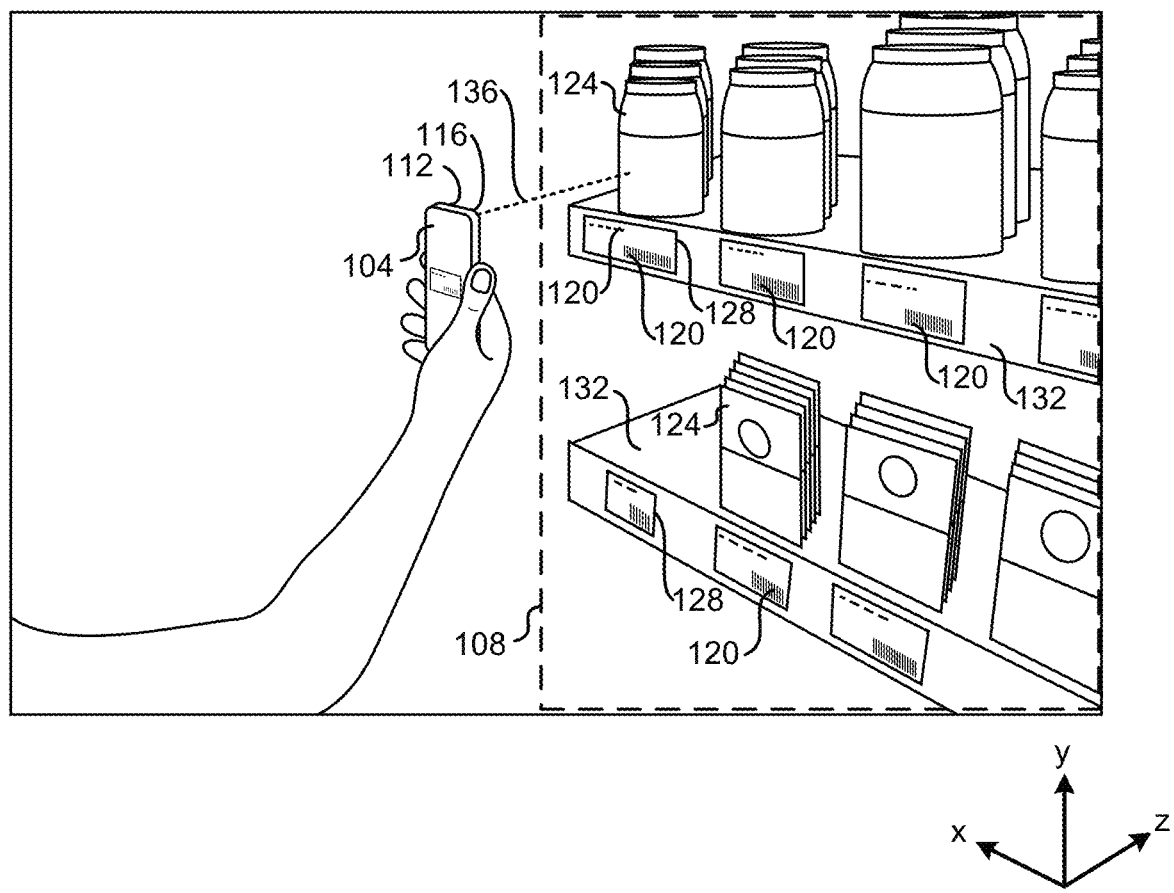
FIG. 1 illustrates an embodiment of a system for decoding optical patterns in a real scene.

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Mobile devices having data connections, cameras, and depth sensors and being capable of hosting many mobile applications offer a flexible and scalable solution for optical pattern decoding. Such devices detect and decode an optical pattern appearing in a real scene, rather than a single optical pattern isolated from its environment. Scenes also may include multiple optical patterns to be distinguished when the scene includes different types of optical patterns, different orientations, different arrangements, or many optical patterns encoding multiple different types of information. Detection of optical patterns appearing in a real scene may include correcting images using depth sensor data prior to image analysis, for example, to correct for perspective, to reduce blurring, and to reduce demand on computational resources resulting from image processing routines used for optical pattern scanning. In some embodiments, depth information (D) is being used as features by a decoding algorithm with image data (e.g., using red, green, and blue (RGB) channels). Such data is referred to as RGB-D data.

Examples of optical patterns include 1D barcodes, 2D barcodes, numbers, letters, and symbols. As scanning optical patterns is moved to mobile devices, there exists a need to increase scanning speed, increase accuracy, and/or manage processing power. Interpreting an optical pattern (e.g., scanning for an optical pattern) can be divided into two steps: detection and decoding. In the detection step, a position of an optical pattern within an image is identified and/or a boundary of the optical pattern is ascertained. In the decoding step, the optical pattern is decoded (e.g., to provide a character string, such as a numerical string, a letter string, or an alphanumeric string). As optical patterns, such as 1D barcodes and QR codes, are used in many areas (e.g., shipping, retail, warehousing, travel), there exists a need for quicker scanning of optical patterns. In some embodiments, optical patterns can include alpha and/or numerical characters. The following are techniques that can increase the speed, accuracy, and/or efficiency of scanning for optical patterns. Techniques can be used individually, in combination with each other, and/or in combination with other techniques. For example, optical patterns can be tracked as disclosed in commonly owned PCT Application PCT/US2021/025212, entitled, "Image Analysis for Tracking, Decoding, and Positing Multiple Optical Patterns," filed on Mar. 31, 2021, which is incorporated by reference in its entirety for all purposes. Commonly owned U.S. patent application Ser. No. 17/016,896, filed on Sep. 10, 2020, is also incorporated by reference in its entirety for all purposes.

Generally, optical pattern detection and decoding is described in the context of discrete optical patterns appearing in a real scene including multiple patterns, objects, and people in a real environment. As an illustrative example, a mobile electronic device, such as a smartphone or tablet, captures and/or receives images taken using a camera. The images include, among other elements in the field of view of the camera, one or more optical patterns, such as barcodes. The mobile electronic device may include a three-dimensional depth sensor, for example, a laser scanning component such as a LiDAR sensor providing depth information correlated to the images taken by the camera. Augmentation of the image data (e.g., RGB image data or YUV image data) with depth information to form RGB-D images may permit multiple improvements to optical pattern detection and scanning techniques implemented by the mobile electronic device. While the forthcoming embodiments are generally described as generating RGB-D images using a LiDAR sensor, RGB-D images may be generated using a sensor providing depth information including, but not limited to, sensors based on time of flight, stereoscopic triangulation, structured light, sheet of light, interferometry, ultrasound, coded aperture, etc.

The techniques described herein may be applied to semantic segmentation of images to focus image processing techniques on one or more regions of interest (ROIs) corresponding to optical patterns, for example, when disposed on objects detected by processing depth information. Segmenting images into regions of interest may improve scanning techniques by potentially reducing computational demands associated with image post-processing and potentially reducing latency associated with repeated image capture resulting from non-uniform image quality (e.g., resulting from uneven lighting in a depth dimension "z").

As another example, depth information may indicate whether an image may be down sampled, for example, when optical patterns are present in the foreground of a super-high resolution digital (SHD) image (e.g., a 4k image, an 8k image, etc.), which may potentially reduce the computational demands of detecting and/or scanning multiple optical patterns in an SHD image. Furthermore, inclusion of depth information may permit optical pattern scanning techniques to correct for perspective skewing, potentially without loss of dimensional information or introduction of distortion to the optical patterns (e.g., as may occur with fronto-parallel rectification based on determining a vanishing point in an image and correcting for perspective).

In some cases, depth information may also be used to de-blur optical patterns appearing in images, which may improve optical pattern scanning in fewer images, may potentially improve performance of optical pattern detection techniques, and may potentially reduce latency and improve speed and accuracy of scanning. For example, using depth information may permit a focal distance to be determined (e.g., based on the ROI), which may reduce latency introduced by refocusing the camera. Similarly, object tracking may be facilitated by RGB-D information, which may permit motion blur reduction as a further potential improvement to image analysis for detection of optical patterns in the real scene.

Embodiments described may be applied to multiple environments including, but not limited to, a retail environment, a logistics environment, identification and/or authentication of people, or a real-world environment including optical patterns encoding information for which detection and/or recognition of the optical patterns is desired. Techniques described may be implemented in other environments or applications including scanning of optical patterns in a real scene.

FIG. 1 illustrates an embodiment of a device 104 for decoding optical patterns in a scene 108 using depth information. The device 104 is a computing device comprising a camera 112 and a depth sensor 116. Device 104 is used to detect and decode optical patterns 120 in the scene 108. The optical patterns 120 can be machine-readable patterns (e.g., one-dimensional or two-dimensional barcodes) and/or characters (e.g., number, letters, and/or symbols). In the embodiment shown, the optical patterns 120 are in a retail environment and correspond to products 124 for sale. For example, optical patterns 120 (e.g., a one-dimensional barcode, a price, and a description) are printed on a label 128 positioned next to a corresponding product 124 available for sale in a store.

The camera 112 is configured to acquire one or more images of the scene 108. The device 104 is a hand-held, mobile device (e.g., a smartphone or a tablet). In the example shown in FIG. 1, the device 104 is a smartphone, and the camera 112 is an embedded camera of the smartphone. In some configurations, the device 104 has more than one outward facing camera and/or one or more inward facing cameras. In the embodiment described, camera 112 is an outward facing camera of the device 104.

The depth sensor 116 is configured to measure the distance between objects in the scene 108 and the device 104. Objects in the scene can include optical patterns 120, products 124, labels 128, walls, floors, ceilings, one or more shelves 132 (e.g., upon which products 124 are resting and/or labels 128 are attached to), and/or other items. In some configurations, the depth sensor 116 is a laser-ranging system, such as a LiDAR (Light Detection and Ranging) system. The laser-ranging system emits a laser beam 136 can calculate a distance between the device 104 and an object in the scene 108 based on a time-of-flight or phase change of light of the laser beam 136 reflecting from the object. The laser-range system includes a scanning function acquiring a plurality of data points per second to create a depth map of at least a portion of the scene 108.

Device 104 is configured to receive an image of the scene 108 acquired by the camera 112 and a depth map of the scene 108, wherein data for the depth map is acquired by the laser-ranging system. The image is spatially correlated with the depth map such an object in the image and in the depth map spatially overlap. Although image analysis can be used to generate a depth map, such as using SLAM (Simultaneous Localization and Mapping), image analysis to generate the depth map can be computationally intense. Thus, in some embodiments, a depth sensor is used instead of image analysis to generate the depth map (e.g., because data in the depth map from a depth sensor is more efficient to work with). Depth data correlated to image data can be used to more efficiently decode optical patterns in a scene.

The camera 112 may capture color image information at a default resolution that may be described in terms of a number of pixels (e.g., MP) and/or a resolution standard (e.g., HD, UHD, 4k, etc.). The images may be captured in full color (e.g., red-green-blue (RGB)) or in a limited form of color image data (e.g., filtered, greyscale, etc.). For example, in some embodiments, the scene 108 may be lit by a specific wavelength of light or a limited range of wavelengths of light to facilitate visual autonomous navigation of a robotic device (e.g., monochromatic light to improve contrast), in which the images may include less than a full spectrum of color information.

The depth sensor 116 may provide depth information for inclusion with the color information to generate enhanced image data ("RGB-D") including, but not limited to, multiple color channels and a depth information channel. For example, in a camera having an RGB image sensor, the device 104 may receive and process a plurality of four-channel images including RGB-D information. The depth information collected by the depth sensor 116 may be used to generate a depth map correlated to the images collected by the camera, such that one or more surfaces in the real scene may be described in terms of a set of axes (e.g., Cartesian coordinates). In some cases, the depth map may be a coarse depth map, with dimensional resolution on the order of centimeters, which may potentially reduce the computational resource demand of processing and generating the depth map relative to a depth map having a smaller dimensional resolution. In some embodiments, the dimensional resolution of the depth map may be dynamic, based, for example, on a reference dimension of a desired feature (e.g., raised lettering or embossed optical patterns with a characteristic dimension on the order of millimeters).

A. Semantic Image Segmentation

Image segmentation is separating an image into regions based on what is being shown. Semantic image segmentation is separating an image into regions based on related distances of objects in the image from the camera used to acquire the image.

In some embodiments, a foreground region of a scene is separated from one or more background regions, and optical patterns in the foreground region(s) are decoded. For example, optical patterns 120 in the labels 128 are in a foreground region of the scene 108 in FIG. 1 because the labels 128 are on fronts of shelves 132. The fronts of shelves 132 are identified as foreground regions, and decoding of barcodes is performed on only the foreground region(s). This can save time because decoding algorithms are not run on full images. Further, semantic image segmentation can be used for better contrast balancing strategies (e.g., meter on the foreground region), better focus strategies (e.g., focus on the foreground region), and/or out of stock or low stock detection (e.g., by measuring a distance, relative or absolute, from a front of a shelf to a product on the shelf).

In some embodiments, images are segmented by partitioning the image into one or more foreground segments (sometimes referred to as regions) and one or more background segments, based on data from the depth map. The one or more foreground segments of the image are analyzed to detect an optical pattern in the water more foreground segments. The optical pattern is then decoded to obtain a data payload (e.g., the optical pattern is decoded to obtain an alphanumeric stock-keeping unit (SKU)). The optical pattern can comprise text (e.g., and decoding the optical pattern comprises optical-character recognition) and/or the optical pattern can comprise a machine-readable code, such as a one-dimensional barcode and/or a two-dimensional barcode (e.g., a QR code).

Figure 2:
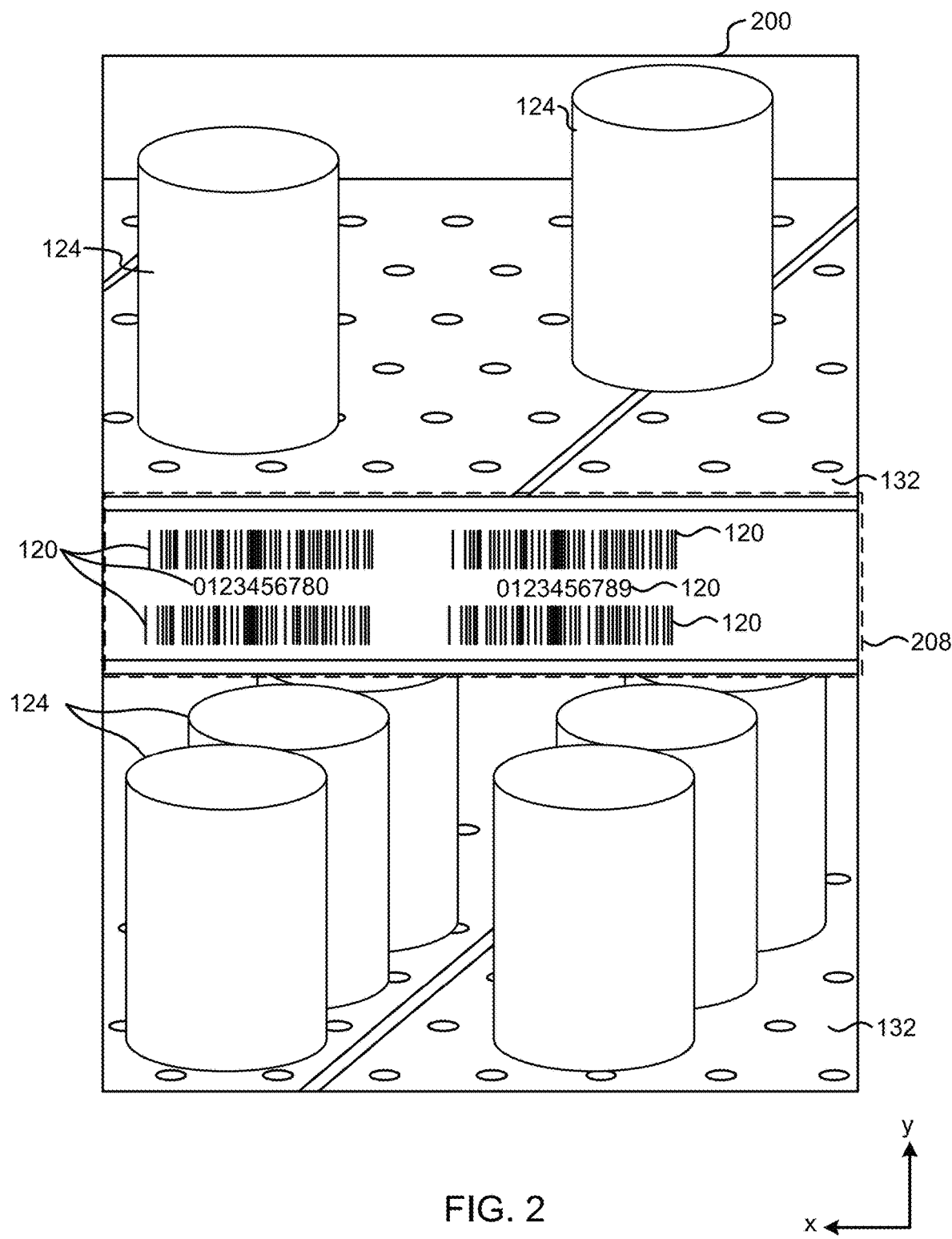
FIG. 2 illustrates an embodiment of an image of a real scene.

FIG. 2 illustrates an embodiment of an image 200 of a scene. Shown in the image 200 are optical patterns 120, shelves 132, and product 124 on the shelves 132.

In some embodiments, depth information may be leveraged (e.g., by the device 104 in FIG. 1 and/or a remote computing device) to perform semantic segmentation operations on images collected by the camera 112 in FIG. 1. Semantic segmentation may describe separation of foreground and background regions of an image. In FIG. 2, a foreground region 208 is a front of a shelf 132, because the front of the shelf is closest to the camera when the image was taken. In some embodiments, a mobile device displaying a QR code is in the foreground region. In some applications, the foreground region 208 is expected to contain one or more optical patterns 120. The foreground region 208 can be detected and/or identified by processing the depth map to identify features in the depth information that indicate an object in the real scene. For example, discontinuities in the depth information (e.g., in the "z" direction) can identify a boundary of the foreground region 208. Discontinuities in the depth information may permit identification of one or more regions of interest (ROI). In this example, the region of interest is the foreground region 208.

Selective image processing can be applied to the region of interest. In some embodiments, selective image processing includes applying contrast, changing brightness, brightness, metering, sharpening, and/or other image processing techniques on the image 200 at the region of interest. In some embodiments, image processing applied to an ROI in one image may also be applied to other images. Camera parameters can also be modified based on an ROI in one image for acquiring a subsequent image. Camera parameters can include, but are not limited to, zoom, focal distance, aperture, and exposure time. This may permit the camera to operate without implementing multiple refocus cycles (e.g., with the focal distance being informed by the depth information and the ROI detection). Such approaches can improve performance of optical pattern scanning and/or reduce latency in image capture and processing, in some situations.

In some embodiments, the depth information, or information derived from depth information, can be used as one or more features in a neural network architecture, such as a deep learning network, a neural network, a type of machine learning algorithm, a Masked CNN (Masked convolutional neural network), CNN, probabilistic network, or Bayesian tree, among others. For example, such approaches may be applied to object detection and identification, character detection and identification, the identification and/or decoding of optical codes, etc.

As an example, an optical pattern can be displayed on a smartphone at a distance from a mobile device (e.g., device 104 in FIG. 1). The mobile device may first detect the smartphone, by detecting that the smartphone is positioned at a predetermined distance (e.g., in the foreground, in a middle position, or in a background) between the mobile device and a background surface (e.g., a back wall). This example may apply to numerous real-world applications, including, but not limited to, boarding pass presentation, identity authorization, electronic payment, or the like, where an optical pattern is presented on a smartphone or tablet for scanning.

As another illustrative example, the ROI may correspond to an object upon which an optical pattern is disposed. The object may include, but is not limited to, items involved in logistics operations (e.g., packages in a sorting facility and/or a warehouse), items in inventory held in a retail environment (e.g., items on store shelves), etc. In such cases, the optical pattern or optical patterns 120 appearing in the real scene may not be directly on an item, but rather may be disposed on another object (e.g., a label template, a shelf, a hopper, a container, etc.) positioned near the item to which the optical pattern corresponds. In the retail shelving environment, for example, multiple optical patterns 120 may be presented (e.g., price labels) in repeating rows on shelves running horizontally, as shown in FIG. 2. The optical patterns 120 may, therefore, be arranged in repeating arrangements in an x-y plane (e.g., on shelves that have a depth in the z-direction). In this way, the foreground region may correspond to the front edge of the shelves where the optical patterns 120 are arranged. The RGB-D information of the images of the real scenes may provide ROIs corresponding to the front edges, from which the device may modify the camera parameters to better resolve the optical patterns 120.

In some embodiments, the device may be provided with an application (e.g., software) configured to facilitate scene and/or scenario understanding. For example, a machine learning (ML) model (e.g., implemented as deep learning features in a neural network) may provide one or more selection and down sampling strategies. Scene understanding may refer to leveraging depth information to determine whether a ROI is positioned at a near distance to the camera, such that optical patterns 120 contained within the ROI may be resolved at a sufficient resolution without processing each pixel of an image at its native resolution (e.g., 4k, UHD, etc.). In such cases, the ML model may select an appropriate image size and an image down sampling factor to generate a down-sampled image at an optimized resolution for optical pattern scanning. The optimized resolution may refer to a resolution lower than the native resolution that retains sufficient information to permit the device (or a remote device) to resolve the optical patterns 120.

Post-processing approaches may permit reduction of latency introduced by refocus. For example, a camera may implement an automatic refocus routine that triggers an autofocus cycle without input from a user (e.g., based on changes occurring within the camera field of view, movement of an object in the real scene, etc.). In some cases, the refocus routine may occur over a period of time during which the camera may be unable to capture images. As such, avoiding unnecessary refocusing may reduce latency of optical pattern 120 scanning. In an illustrative example, parcels on a conveyor belt may pass through a camera field of view of a mobile electronic device, wherein the mobile device is in a fixed position (e.g., when the mobile device is used in a logistical system to track packages). In such cases, refocusing may be unnecessary when parcels are carried on the conveyor at a consistent distance (e.g., within a range that does not extend outside the focal range of the camera), and, as such, the identification of the distance of a parcel may permit the mobile device to prevent the initiation of a refocus routine.

In some cases, multiple optical patterns 120 may be disposed on a single object (e.g., in the case of a multi-code label). In such cases, some of the optical patterns 120 may be in focus, while others may be out of focus. Rather than refocusing on each optical pattern 120, the depth map may facilitate de-blurring of the multiple optical patterns 120 in post-processing (e.g., using a ML model). In some embodiments, a focus table may be established that specifies a specific focus setting for a specific depth. The camera can adjust the focus directly to the depth sensed by the depth sensor, rather than performing an iterative focusing sequence, which may include capturing multiple images before arriving at the desired focal setting, which may potentially improve latency and performance of image analysis processes.

In some embodiments, hand and object segmentation and tracking may facilitate extraction of an outline of a person from a sequence of video images. In this way, it may be possible to track the movement of a hand or other body parts. Likewise, it may be possible to pick out an object from the RGB frame. However, it may be difficult to associate a hand with an object in a 3D environment. For example, in a retail store, it may be difficult to associate the hand of a shopper with an object being removed from a shelf. A depth sensor, including a LiDAR sensor, may permit pinpointing the distance of a hand, an object, and a shelf from the RGB-D information, and may permit distinguishing the different elements in the images (e.g., as different ROIs in the image).

In some embodiments, depth information may permit the position of the device to be extrapolated relative to a representation of the real scene (e.g., a store map, a model of the store). While conventional location tracking algorithms on mobile phones may rely on visual clues (RGB data), gyroscopic and inertial information (e.g., from an inertial measurement unit (IMU)), and wireless signals (Wi-Fi finger printing, Bluetooth beacons), depth information may permit the position of the device to be ascertained (and hence facilitate reconstruction of the shelf and store state) based on the images taken by the device, potentially without additional information provided by the aforementioned systems.

In some embodiments, depth information may be used for better torch (camera flashlight) control. The torch can be automatically enabled when the image does not show enough contrast. Using depth information can potentially limit the contrast estimation to a set of ROIs. Furthermore, analyzing scattering of LIDAR can be used to detect reflective surfaces and to disable the torch, for example, in conditions where enabling the torch can lead to glare and scanning/decoding issues. Further, depth information may be used to select a brightness of the torch. In an example, for reading barcodes on parcels on a conveyor belt, the torch is turned off when a parcel is not present and turned on what a parcel is detected.

B. Perspective Distortion Correction

Figure 4:
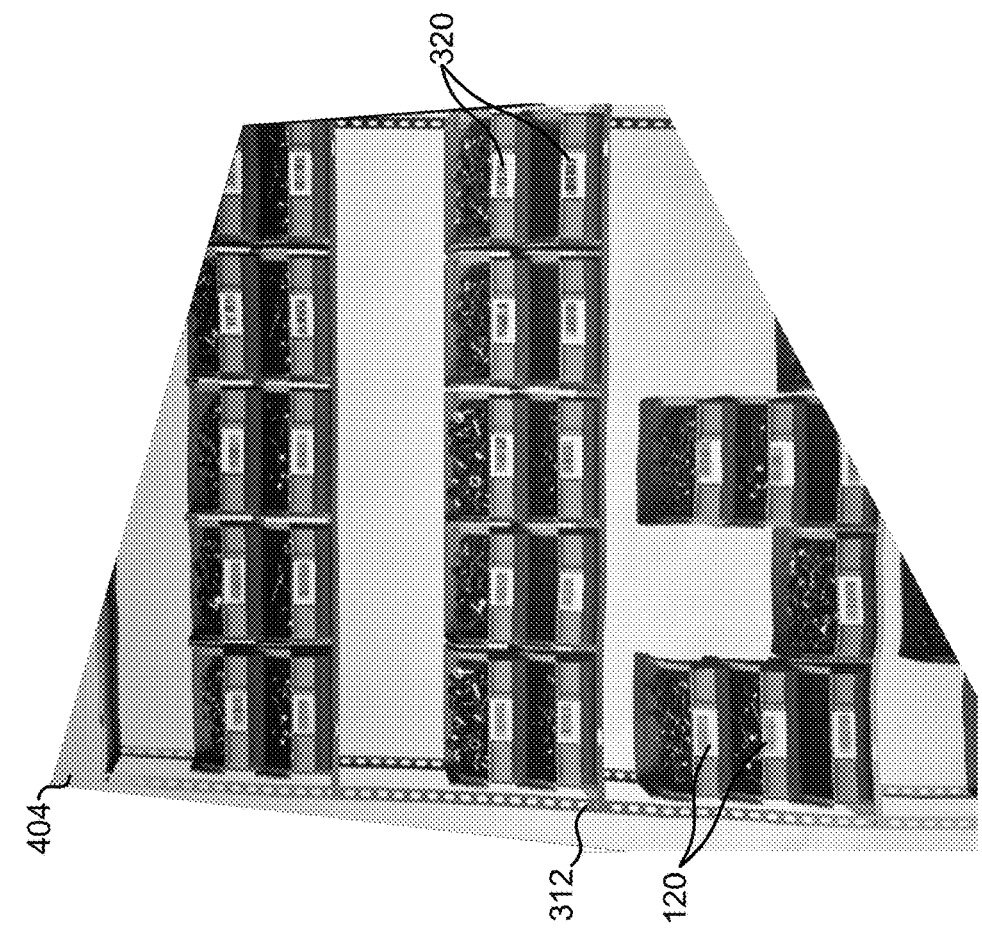
FIG. 4 is an embodiment of a second image of the scene obtained by distorting the first image of FIG. 3 so that the shelf plane is parallel with the image plane.
Figure 3:
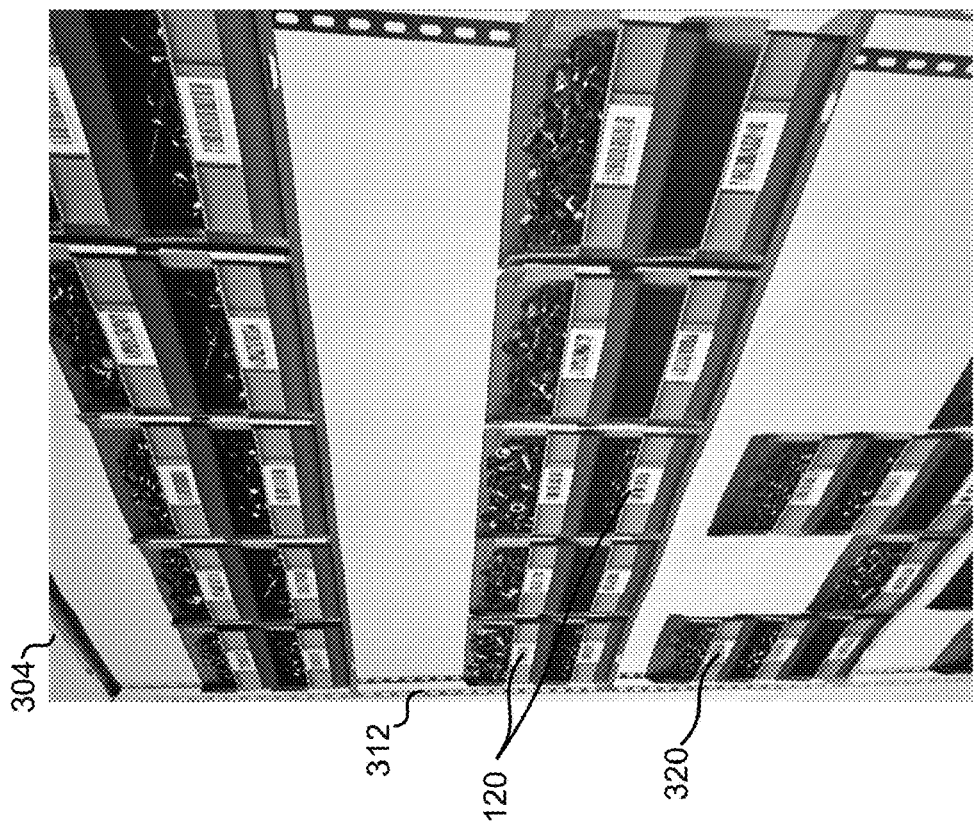
FIG. 3 is an embodiment of a first image of a scene with a shelf plane that is not parallel with the image plane.

Depth information can be used for distortion correction and guided image de-blurring. FIG. 3 is an embodiment of a first image 304 of a scene with a shelf plane that is not parallel with the image plane. FIG. 4 is an embodiment of second image 404 of the scene obtained by distorting the first image 304 from FIG. 3, so that the shelf plane is parallel with the second image 404. FIGS. 3 and 4 illustrate perspective correction of an embodiment of an image containing multiple optical patterns using depth information. Depth information included as part of RGB-D images may permit perspective distortion correction using depth-based plane estimation. Depth-based plane estimation may describe a process by which depth information in the RGB-D image may be processed with the image data (e.g., a two-dimensional pixel map of intensity values in one or more color channels) to detect edges and correlate them to a perspective of the camera relative to objects in the real scene.

As shown in FIG. 3, a first image 304 (sometimes referred to as a native image) captured of a real scene may include multiple optical patterns 120 (e.g., affixed to labels on containers on a storage shelf 312). In some cases, the first image 304 may have been captured at a low angle relative to the front of the shelf 312, and, as such, image effects (e.g., foreshortening) may distort the optical patterns 120 appearing in the first image 304. As shown, optical patterns 120 appearing in the foreground may appear larger than optical patterns 120 appearing in the background of the first image 304, and the optical patterns 120 may appear with a distorted aspect ratio compared to the actual aspect ratio of the optical patterns 120 in the real scene (e.g., the native image may show the optical patterns 120 with a perspective distortion). In such cases, distorted optical patterns may be indecipherable, due, for example, to a distortion of the encoding of information. For this reason, a low proportion of optical patterns 120 appearing in the first image 304 may be successfully scanned, as indicated by a graphical element 320 overlaid on those optical patterns 120 being detected and/or scanned. While perspective distortion may be corrected with image processing techniques that do not include depth information (e.g., tracing a vanishing point, planorectification, etc.), the depth information generated by a LiDAR system may permit the definition of an x-y plane corresponding to the front of the shelf 312, such that the image may be corrected to fix the shelf plane to be parallel with the image plane, as shown in the second image 404.

Perspective correction can also be extended to curved surfaces (e.g., scanning barcodes on non-planar products). Another application would be documents, such as airline tickets. During self-check-in, tickets can be crumpled or folded. The bending can lead to decoding issues, which potentially can be corrected by estimating the surface curvature using depth information.

FIG. 4 shows a possible result of perspective correction in an example of the second image 404, which is a corrected image of the first image 304, which may not retain a rectangular aspect ratio due to being distorted in line with the calculated x-y plane indicated by depth information. In the second image 404, the optical patterns 120 are shown with a uniform shape, as is the shelf 312, which appears as if the camera is positioned facing forward toward the shelf 312 (e.g., a front of the shelf 312 is parallel to the x/y image plane). In such cases, optical patterns 120 included in the second image 404 may be decipherable, such that scanning multiple optical patterns 120 may be more successful than in the case of the first image 304, as may be illustrated by a relatively higher number of graphical elements 320 being overlaid on optical patterns 120 successfully being scanned.

The depth map may permit depth-guided single image de-blurring. In some embodiments, an ML model (e.g., a deep learning implementation) may permit post-processing of RGB-D images to correct for blurring caused by one or more factors including, but not limited to, an optical pattern 120 being positioned outside the focal distance of the camera (e.g., not resolved). In some cases, such de-blurring may be facilitated by an ML model trained (e.g., by supervised reinforcement learning) with an image training set of optical patterns collected at controlled positions relative to a focal plane of the camera. In some embodiments, more than one RGB-D image of the same scene or object may be used to de-blur the scene. In some embodiments, more than one RGB-D image of the same scene or object taken at more than a single distance from the object or scene may be used to de-blur the scene.

Figure 5:
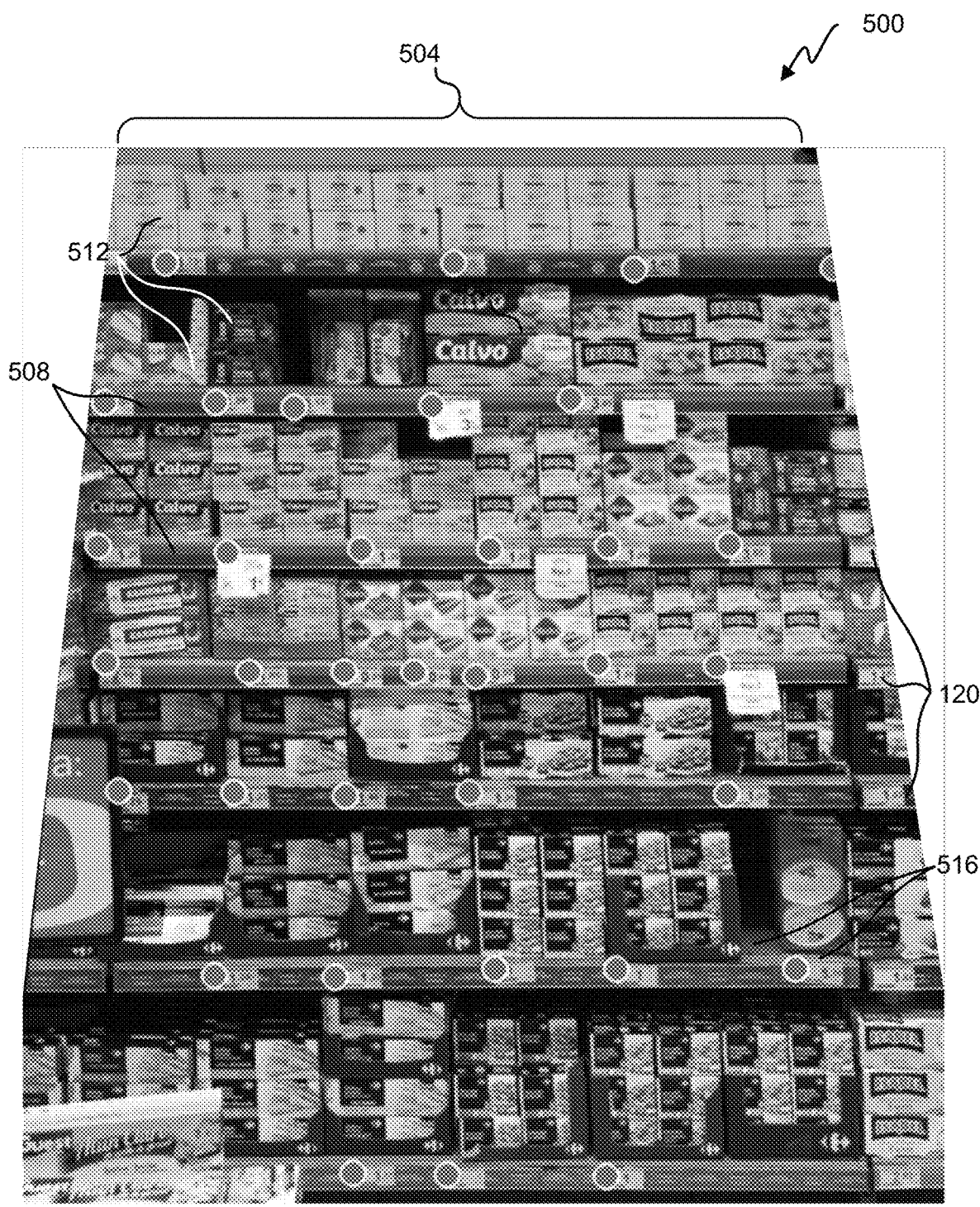
FIG. 5 is an embodiment of an image of a retail shelf that has been rectified in a homographic transform.

FIG. 5 is an embodiment of an image 500 of a retail shelf that has been rectified in a homographic transform. As a potential advantage of using depth information for image correction, relying on depth information may also protect the real dimensions of the optical patterns and improve the accuracy of scanning as a result.

For example, using 3D plane information may improve homography estimation. RGB homographies of a shelf or aisle (e.g., homography estimation by image processing alone) may rely on strong visual features to establish the visual plane. Typically, horizontal features are strong (the shelves themselves) and vertical features can be varied and, in some cases, non-existing (for example, when shelves are empty). As a result, rectification homography can be distorted in some dimensions. With depth information (e.g., provided by LiDAR), the x/y plane becomes well defined, even if there are only a limited number of points in the plane of the front of the shelf.

FIG. 5 is an embodiment of a real scene including a retail shelf that has been rectified in a homographic transform. RGB-D information can be used to generate a plane representing the front face of the retail shelf (e.g., homography). For example, an aisle in a retail environment may be segmented into a shelving unit 504, which may include multiple shelves 508 of a defined length (e.g., two meters, three meters, etc.). A real scene, such as a retail environment, may include multiple horizontal shelves 508 including multiple optical patterns 120 (e.g., price labels, barcodes, two-dimensional optical codes, etc.) correlated to a position on the shelves 508 occupied by items 512 corresponding to information encoded in the optical patterns 120. Using a plane describing the front face of the shelving unit 504, images of the shelving unit 504 may be rectified, as described in more detail in reference to FIGS. 3 and 4, to potentially improve detection and/or scanning of the optical patterns 120.

In some cases, for example where the items 512 are stored on the shelves 508 in such a way that the items 512 are stocked from the rear of the shelves 508 toward the front of the shelves, depth information may permit determining inventory levels, shelf capacity, or other inventory information in reference to the front face of the shelving unit 504. For example, an item 512 for which the shelf 508 is not fully stocked may present an empty space 516 either in front of the item 512 or an empty space 516 on the shelf 508. In some embodiments, empty spaces 516, relative to the plane of the shelving unit may permit ascertaining an out of stock item 512 or a stock level of an item 512.

Figure 6:
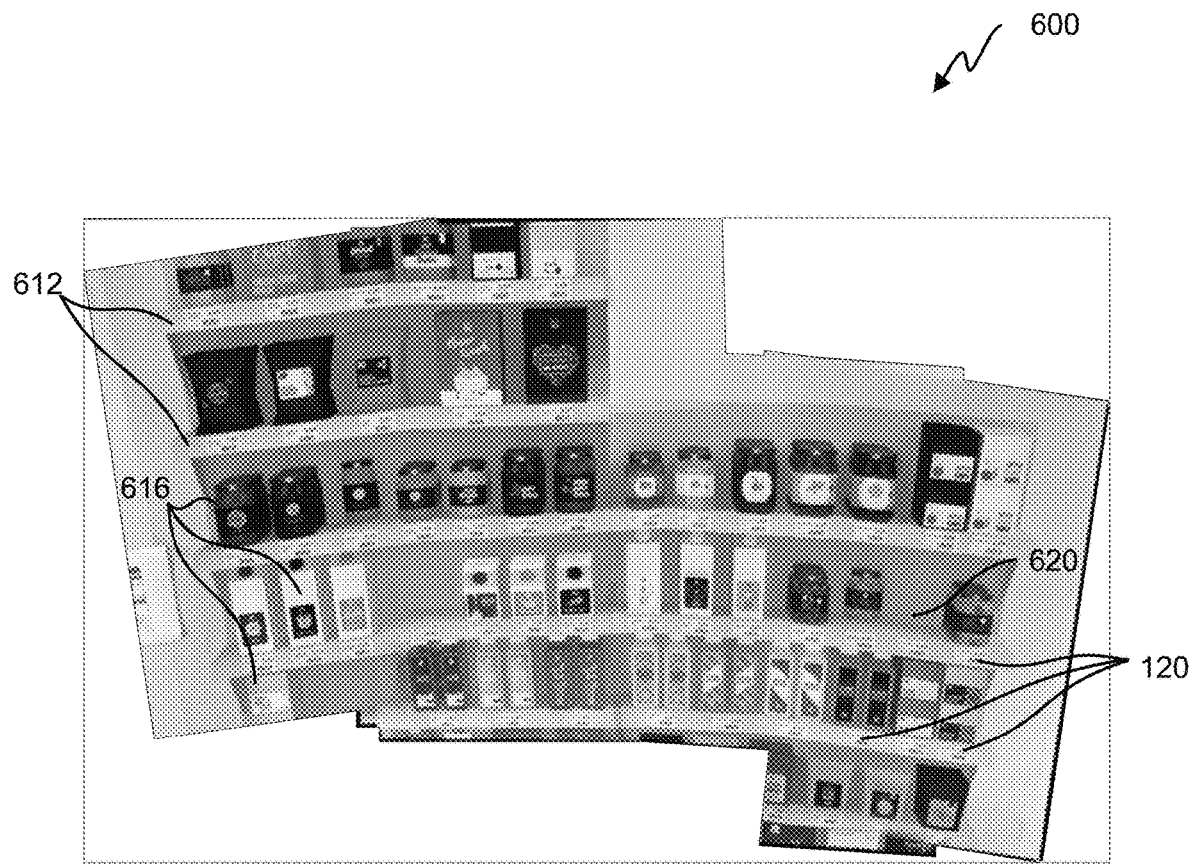
FIG. 6 is an embodiment of a stitched image using depth data for stitching.

FIG. 6 is an embodiment of a composite image 600 using depth data (e.g., spatial measurements) to stitch images of a scene. In some embodiments, spatial measurements may permit improved image stitching in multi-frame (e.g., panoramic) imaging. For example, when a distance to a shelf 612 (e.g., in a shelving system including multiple shelves) is known, a scale of features common to multiple frames can be known by processing of image features with depth information. In this way, multiple frames may be overlapped and stitched together with corrected perspective and potentially with reduced error in sizing and/or distortion. In some embodiments, the estimated size and/or position information of one object in an image along with the estimated size and/or position information of the object in a second image can be used to align the images accordingly.

In some embodiments, generating the composite image 600 may be implemented for detection of item stock level and/or quantity (e.g., out of stock detection). Such techniques may be facilitated using a depth map, and in some cases in combination with object detection (e.g., of items 616 on shelves 612). For example, 3D segmentation for stock counting may proceed by detecting regions in an RGB-D image corresponding to the items 616 on the shelf 612 using the depth information and/or image analysis. This approach may also facilitate the detection of empty spaces 620 on the shelves 612, inventory levels (e.g., when items 616 are not brought to the front of the shelves 612), and sizing of items 616 on a shelf 612, for example, to correlate the items 616 to the information encoded in optical patterns 120 (e.g., for inventory inspection).

In some embodiments, depth information may permit a user to be guided when taking images of optical patterns 120 in a real scene. For example, the depth information may permit the determination of a focal plane in the real scene, and the user may be directed to capture images at an appropriate distance from the shelf 612. For example, the appropriate distance may correspond to a focal distance optimized for scanning of the optical patterns 120. Similarly, depth information may permit an estimate of the rotation of the camera and/or the device (e.g., the device 104 in FIG. 1). Estimation of ego-rotation may be facilitated, for example, by tracking the focus plane of the images. In some embodiments, this approach can be implemented in combination with a gyroscope incorporated in the device.

As part of determining the shape and size of objects in a real scene, RGB sensors alone may approximate a relative shape of an object, while calibrating the dimensions of the object can be accomplished using a reference. In some embodiments, LiDAR can be used to calibrate the dimension of an object, for example, by measuring the distance between the object and the mobile electronic device. This method can be applied to luggage, for example, at an airport or, as another example, to estimate the size of parcels.

In another example, at the self-check-out stations (e.g., scanners) in supermarkets and retail stores, shoppers may make mistakes and/or intentionally scan incorrect items. Some common instances include, but are not limited to, a shopper scanning an inexpensive item and placing an expensive item in a shopping basket, a shopper scanning one item but placing multiple items the shopping basket, and a shopper moving an item across the scanner while obscuring the optical pattern (e.g., in a way that it does not scan at all). To that end, an RGB-D sensor can be used to implement quality assurance in addition to the scan functionality. In some embodiments, the RGB camera can identify an object using object recognition as it moves across the scanner or in the vicinity of the scanner. The RGB sensor can be used to detect the pose of the shopper, including the shopper's hands, while the LiDAR sensor can be used to determine the spatial intersection of the user's hand and the item being handled. Other information may also be obtained, for example, if the shopper is handling one object or more, or if an object has passed in front of the scanner but an optical pattern has not been recorded by the scanner.

In some embodiments, three-dimensional information is used to better position a device in relation to a store map. Location tracking algorithms on mobile phones can rely on visual clues (RGB data), gyroscopic and inertial information (IMUs), depth information, and/or wireless signals (e.g., Wi-Fi finger printing, Bluetooth beacons). In some embodiments, the depth information potentially assists in refining a position of the user/device and, hence, can facilitate reconstruction of a shelf and store state based on the imagery taken.

C. Optical Decoding of an Embossed Pattern

In some embodiments, depth information is used to help detect and/or decode embossed patterns. An embossed pattern is a one-dimensional or two-dimensional pattern on a structure having variation in depth (e.g., a three-dimensional structure with two-dimensional information). In some embodiments, the pattern is three dimensional. An embossed pattern can be used for harsh environments (e.g., where print or paint could wear off). Embossed patterns can also be used for enabling information transfer, such as embossed numbers on a credit card allowing for imprinting the credit card.

Figure 7:
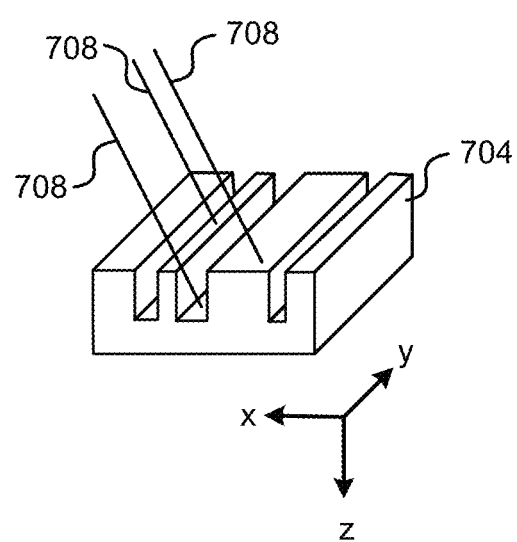
FIG. 7 illustrates an embodiment of an embossed code.

FIG. 7 illustrates an embodiment of an embossed pattern. A pattern 704 in FIG. 7 is an embossed pattern. The pattern 704 has depth variation (e.g., in the z direction) for a one-dimensional barcode (e.g., extending in the x direction). Light 708 (e.g., laser beam from a depth sensor) can be used to detect the pattern 704 by detecting variations in depth.

In some embodiments, detection of subtle depth variation for OCR and optical patterns may be facilitated by depth information-leveraged techniques. For example, credit cards typically use raised, or embossed, characters. In some embodiments, a depth sensor may be used to detect those subtle variations and use them to decode the characters of symbols or help with the decoding that is primarily done by other sensors, including RGB sensors, NFC sensors, RFID sensors, and Bluetooth transmitters and receivers. For example, the depth sensor may be used to detect the location of such symbols. Similarly, embossed two-dimensional optical patterns (e.g., QR codes) may encode information as embossed or otherwise raised patterns, i.e., the binary information is encoded in high and low areas. In some embodiments, LiDAR or depth sensing can be used to detect the high/low areas and assist the decoding of the optical pattern. In some embodiments, the depth sensor may be used to enhance the recognition of faces. Human faces may be better recognized by supplementing RGB information with discriminating information encoded in the 3D shape of the face (e.g., by using an RGB-D image).

In another example, depth information is used to detect a braille pattern. Depth information can be used to detect raised dots. Raised dots are often marked with contrasting color than a background. Though the depth information might not be able to decode the braille pattern, an image from the camera might be able to. As an example, buildings with elevators commonly mark a floor number with braille at a doorway to the elevator. A blind person could move a mobile device around the doorway. The mobile device detects the presence of a braille code, using the depth sensor. An image of the braille code acquired and used to decode the braille code (e.g., a portion of the image corresponding to a location of the braille code). The mobile device then generates an audio sound of the decoded payload data (e.g., the mobile device sends data to a speaker of the mobile device that a virtual assistant says the word, "six," for sixth floor). Using image and/or depth data to decode braille patterns can be beneficial for a blind person in a public place who wants to avoid touching surfaces in the public place (e.g., for hygiene reasons; due to COVID). Symbols, such as an embossed triangle pointing down can also be decoded as "down," so that the blind person can estimate where the "down" elevator button is at the doorway (e.g., before attempting to feel or press the down button). The device could also OCR visual numbers and/or letters. However, using depth information to detect braille patterns can be a tool to detect a region of interest, and/or filter out other characters/words in a scene.

D. Object Outline Extraction

Depth information can be used for object tracking and/or segmentation. For example, a hand can be tracked. In some embodiments, motion de-blurring and/or tracking may be facilitated by motion estimation implemented as part of an RGB-D scene flow feature. In some cases, pixels may be tracked from one frame to another in a motion image (e.g., a video). Inclusion of depth information may improve both accuracy and performance of feature tracking routines, for example, by defining extents of objects appearing in the real scene and correlating pixels to objects to potentially facilitate feature tracking. Depth information can also be used for dimensioning (e.g., luggage, quality assurance, and/or security).

A device may be configured to automatically scan for optical patterns 120 disposed on or near objects of a certain size, where the size may be determined using combined processing of RGB-D images. In some embodiments, volume estimation (e.g., with applications in baggage sizing and parcel dimensioning) may be facilitated by object outline extraction in combination with semantic segmentation. For example, a volume of an object may be estimated by revolving the object around an axis (e.g., the y-axis and/or the z-axis) or by stitching together multiple images of the object (e.g., generated by moving the device around the object, such as using a "flyover" technique). Similarly, end-to-end 3D bounding box regression on RGB-D data in image(s) may provide volume information by estimating a volume occupied by the object in the real scene. In another example, the depth sensor may be used to estimate the distance of an object from the camera. For example, a user and/or robotic data collector in a retail store may estimate the distance of a price label or product from the sensor in order to accurately estimate the position of the label or object relative to the position of the robot. Using RGB-D, such estimates may potentially improve accuracy of image analysis, relative to using just RGB sensors, and the estimates can potentially be performed with less image material.

Figure 8:
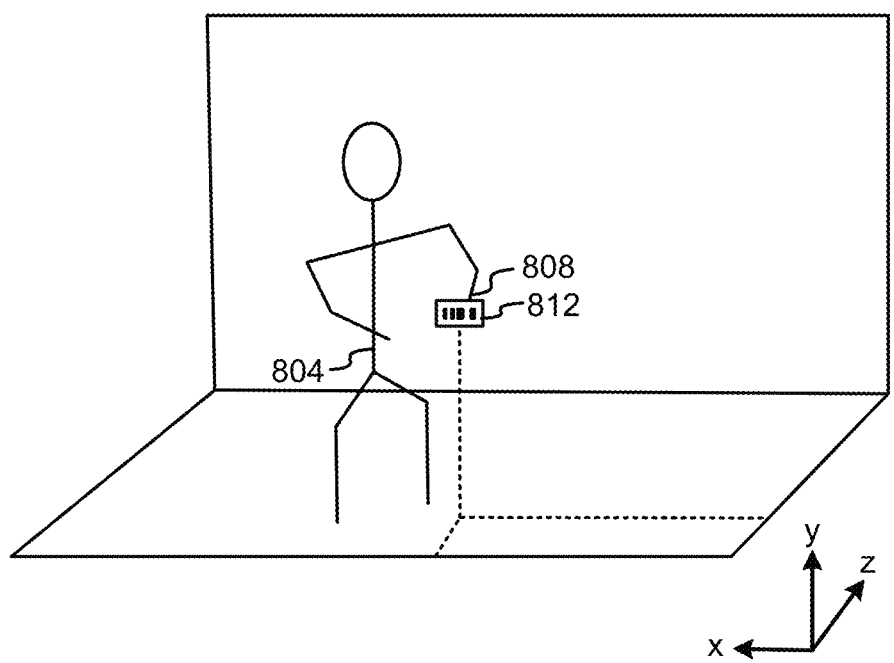
FIG. 8 illustrates an embodiment of object outline extraction using tracking of a skeletal representation of human posture.

FIG. 8 illustrates an embodiment of object outline extraction using tracking of a skeletal representation 804 of human posture. Tracking the skeletal representation 804 can be used for hand and/or object segmentation and tracking.

With posture tracking technology, it is possible to extract an outline of a person (e.g., the skeletal representation 804) from a sequence of video images. It is also possible to track the movement of a hand 808 or other body part. It is also possible to pick out an object from the RGB frame. However, it can be difficult to associate a hand with an object in a 3D environment. For example, in a retail store, it can be difficult to associate the hand of a shopper with an object being removed from a shelf. A depth sensor can potentially improve resolving ambiguity. The depth sensor can calculate a distance of the hand, object, or shelf from the device (e.g., the device 104 in FIG. 1).

In some embodiments, the hand 808 is tracked to locate and/or track an object 812 held by the hand 808. The object 812 comprises an optical code. The device can detect the hand 808 and/or the object 812 using a combination of RGB images and a depth sensor. The camera zooms in and/or focuses on the object 812 and decodes the optical pattern. This approach has applicability for QR code based payment systems, peer-to-peer payment systems, ticket scanning, boarding pass scanning, ID scanning (one person is holding up their ID and another person is trying to scan the ID with a smartphone or iPad).

For example, an airline passenger is to show a barcode on a boarding pass before boarding an airplane. A device (e.g., device 104 in FIG. 4), tracks a hand of the passenger using the skeletal representation 804 of the passenger. The device then detects the presence of the boarding pass and/or the barcode by searching in a restricted area around the hand 808 of the passenger. One or more camera parameters (e.g., zoom, focus, exposure, aperture) are changed based on a distance of the hand (and/or the pass and/or the barcode) calculated by the depth sensor. An image of the barcode is acquired, and the barcode is decoded.

In another example, consider a person as a patient in a hospital that carries a wristband with an optical identifier. In this example, the RGB-D sensor may be used to track the pose of the person and/or track the position of the wrist and locate and/or decode the optical code on the wristband.

In some embodiments, a region of interest can be defined based on a user input (e.g., a screen touch), from which depth data may be processed (e.g., by steepest descent algorithms) to identify prominent features around the region of the images corresponding to the user input.

Some embodiments may be applied in augmented reality (AR) features based on localization of optical patterns and objects. For example, 3D plane rendering may permit visualization of AR features (e.g., labels, identifier patterns, etc.) and other visual indicators superimposed on images as presented on a display. For example, in addition to locating a device within a locale (e.g., the environment of the device), AR features may include guidance for movement or navigation within the locale (e.g., identification of hallways in the environment, aisles, etc.). In some cases, this may include visual and/or auditory cues presented through a display and/or the device.

Figure 9:
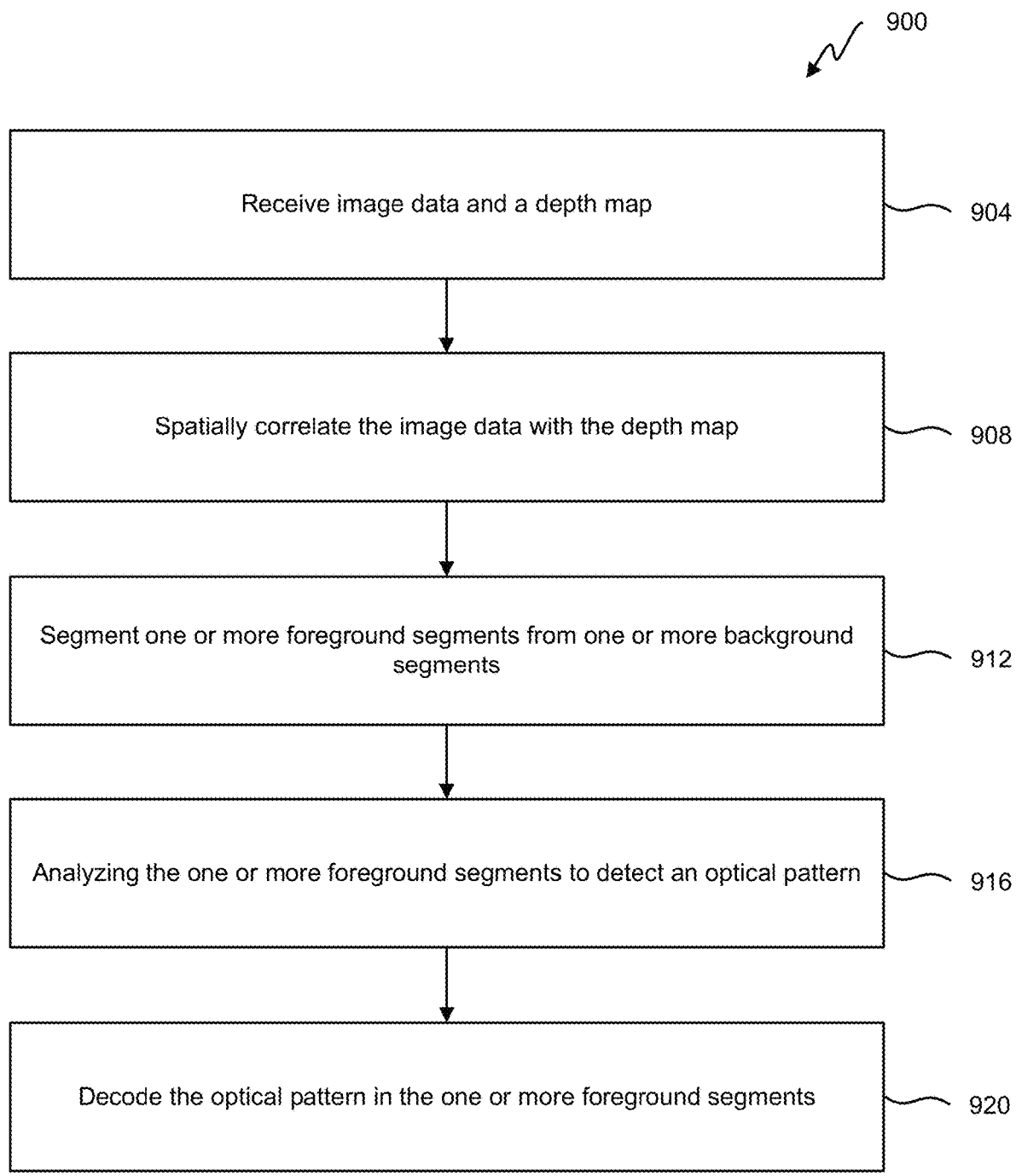
FIG. 9 illustrates an embodiment of a process for detecting an optical pattern in a foreground of an image using semantic image segmentation.

E. Example Embodiments of Processes for using depth information in detecting optical codes FIG. 9 illustrates an embodiment of a process 900 for detecting and decoding an optical pattern in a foreground of an image using semantic image segmentation. Process 900 begins in step 904 with receiving image data and a depth map. The image data is from an in image (e.g., image 200 in FIG. 2) of a real scene. The depth map is of the real scene and is acquired by a ranging system using a laser (e.g., using a LiDAR system). The image data and the depth map can be received at a device comprising a camera used to acquire the image data (e.g., device 104 in FIG. 1) and/or at a remote device, such as a remote server. In some embodiments, a remote server is used for increased computational resources and/or so a mobile device application is not as large.

In step 908, the image data is spatially correlated with the depth map. Data can be spatially correlated at the device comprising the camera (e.g., device 104 in FIG. 1) and/or at a remote device.

In step 912, the image data is segmented by partitioning the image data into one or more foreground segments and one or more background segments, based on data from the depth map. For example, the foreground region 208 in FIG. 2 is partitioned from other parts of the image 200.

In step 916, the one or more foreground segments are analyzed to detect an optical pattern in the one or more foreground segments. For example, optical patterns 120 in the foreground region 208 in FIG. 2 are detected. In step 920, the optical pattern is decoded to obtain a data payload, after detecting the optical pattern in the one or more foreground segments. For example, the optical pattern "0123456780" in FIG. 2 is OCR'd and the data payload "0123456780" is obtained, and/or barcodes in the foreground region 208 are decoded.

By not scanning the entire image (e.g., image 200 in FIG. 2), detecting optical patterns in the foreground does not use as much computational resources compared to scanning the entire image.

In some embodiments, the process further comprises saving the data payload and transmitting the data payload wirelessly to another device. For example, the data payload could be saved to the device 104 in FIG. 1 and/or transmitted to a remote server. In some embodiments, receiving the image data and data for the depth map is received by a remote server, and/or segmenting the image is done using the remote server. In some embodiments, an image is down sampled to obtain the image data. For example, a resolution of image 200 in FIG. 2 is decreased before transmitting the image to a remote server for processing. Similarly, depth data can be down sampled before the depth data is transmitted.

Figure 10:
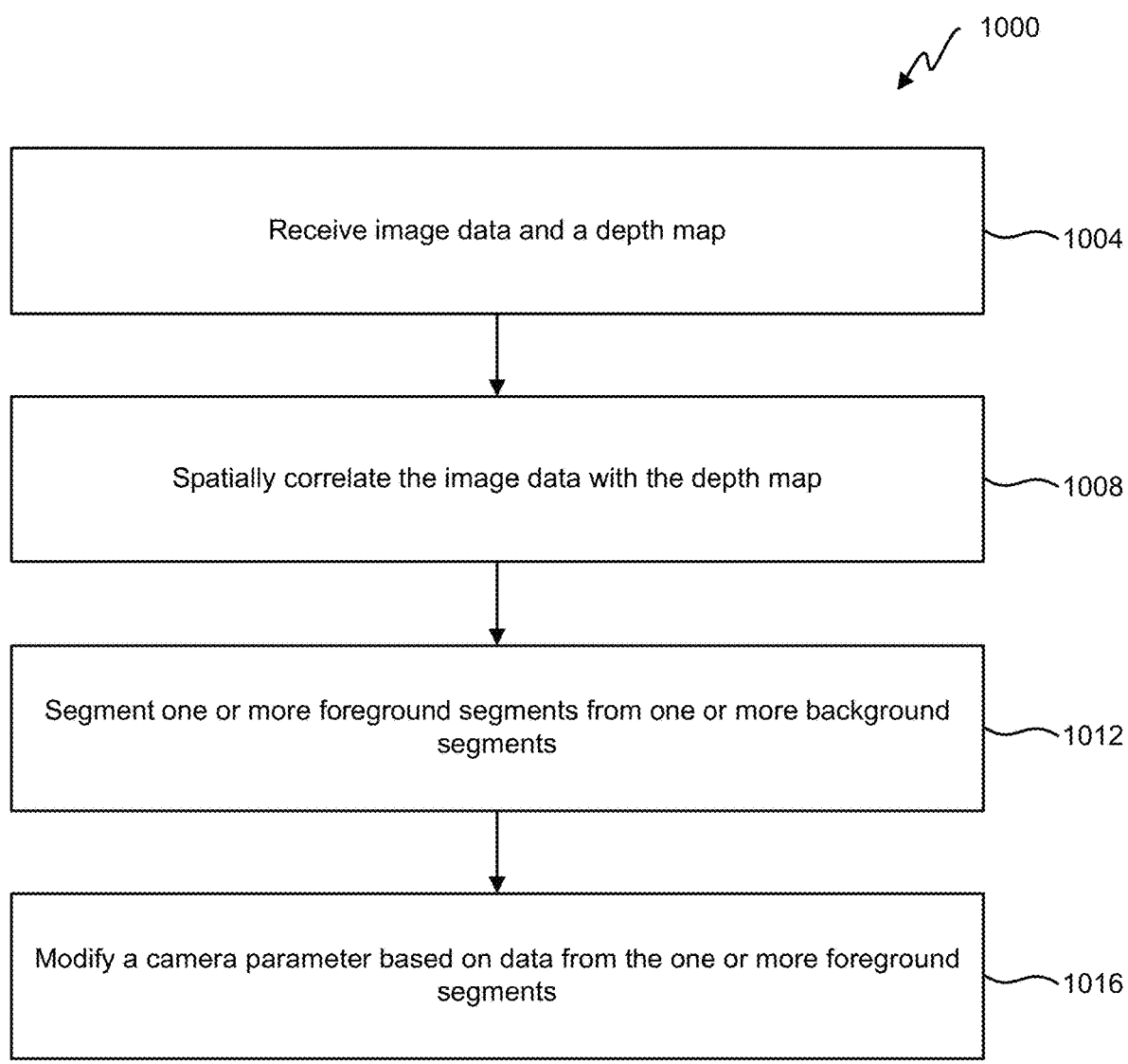
FIG. 10 illustrates an embodiment of a process for updating a camera parameter based on semantic image segmentation using depth data.

FIG. 10 illustrates an embodiment of a process 1000 for updating a camera parameter based on semantic image segmentation using depth data. Process 1000 begins in step 1004 with receiving image data and a depth map. The image data is from an image (e.g., image 200 in FIG. 2) of a real scene. The depth map is of the real scene and is acquired by a ranging system using a laser (e.g., using a LiDAR system). The image data and the depth map can be received at a device comprising a camera used to acquire the image data (e.g., device 104 in FIG. 1) and/or at a remote device, such as a remote server. In some embodiments, a remote server is used for increased computational resources and/or so a mobile device application is not as large.

In step 1008, the image data is spatially correlated with the depth map. Data can be spatially correlated at the device comprising the camera (e.g., device 104 in FIG. 1) and/or at a remote device.

In step 912, the image data is segmented by partitioning the image data into one or more foreground segments and one or more background segments, based on data from the depth map. For example, the foreground region 208 in FIG. 2 is partitioned from other parts of the image 200.

In step 916, a camera parameter is modified based on data from the one or more foreground segments. For example, the camera 112 in FIG. 1 changes focus to focus on the foreground region 208 in FIG. 2 (e.g., before acquiring the image used to decode the optical code in FIG. 9). A camera parameter can include focus, center, magnification, white balance, aperture, shutter speed, ISO, and/or contrast of the camera.

Figure 11:
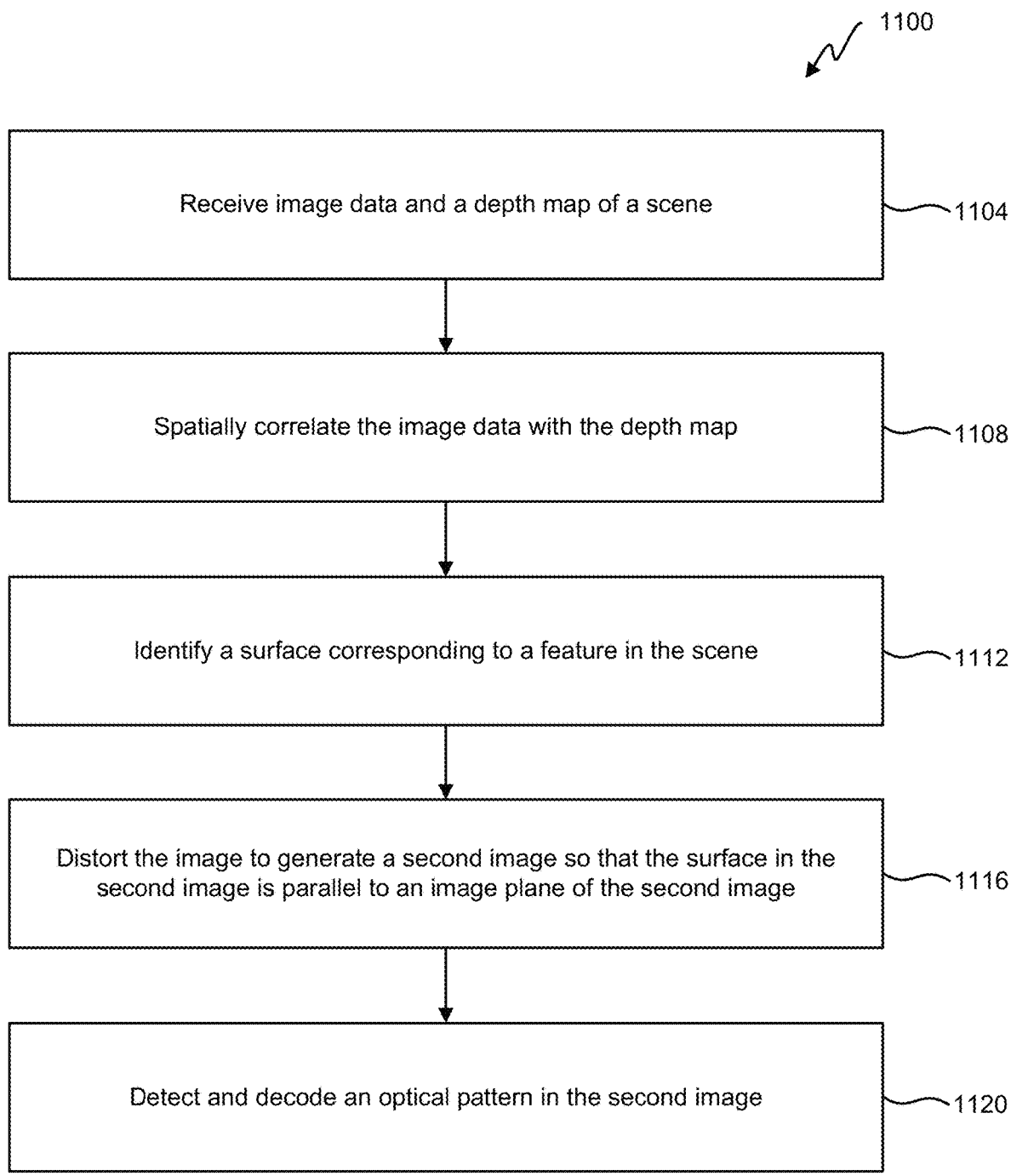
FIG. 11 illustrates an embodiment of a process for perspective distortion correction in an image before decoding an optical pattern.

FIG. 11 illustrates an embodiment of a process 1100 for perspective distortion correction in an image before decoding an optical pattern. Process 1100 begins in step 1104 with receiving image data and a depth map. The image data is from an in image (e.g., the first image 304 in FIG. 3) of a real scene. The depth map is of the real scene and is acquired by a ranging system using a laser (e.g., using a LiDAR system). The image data and the depth map can be received at a device comprising a camera used to acquire the image data (e.g., device 104 in FIG. 1) and/or at a remote device, such as a remote server. In some embodiments, a remote server is used for increased computational resources and/or so a mobile device application is not as large.

In step 1108, the image data is spatially correlated with the depth map. Data can be spatially correlated at the device comprising the camera (e.g., device 104 in FIG. 1) and/or at a remote device.

In step 1112, a surface in the real scene is identified using the depth map, wherein the surface corresponds to a feature in the real scene. For example, the surface could be a front of shelf 312 or a front of one or more bins in the first image 304 in FIG. 3.

In step 1116, the first image is distorted to generate a second image, so that the surface in the second image is parallel to an image plane of the second image. For example, the first image 304 in FIG. 3 is distorted to generate the second image 404 in FIG. 4. A plane of a front of the shelf 312 (and/or a plane of a label in FIG. 4) is parallel with the plane of the second image 404.

In step 1120, the second image is analyzed to detect an optical pattern in the second image, and the optical pattern is decoded to obtain a data payload. For example, one or more optical patterns 120 in the second image 404 of FIG. 4 are detected and decoded. Since the second figure is deformed, the optical patterns are easier to decode.

In some embodiments, the feature is a shelf in a retail environment and/or the surface is a plane (e.g., such as a plane of the front of the shelf 312 in FIGS. 3 and 4). In some embodiments, the surface is a curved surface. For example, a barcode is on a sticker label that is placed on a basketball, so that the label is on a curved surface. An image of the sticker label could be deformed, based on depth data, to generate an image where the barcode is in a plane that is parallel with the image. The depth information of the surface can also be used to calculate a homography perspective of the camera with respect to the surface. For example, depth information can be used to calculate a relative angle and/or position of the camera to the surface. Depth information can also provide scale.

In some embodiments, the method further comprises de-blurring the surface in the second image using the depth map. In FIG. 4, optical patterns 120 on the left of the second image 404 may not be in the same focus as optical patterns on the right of the second image 404. The depth data can be used to de-blur portions of the second image 404 so that optical patterns can be decoded (e.g., without acquiring another image with a different focus).

Figure 12:
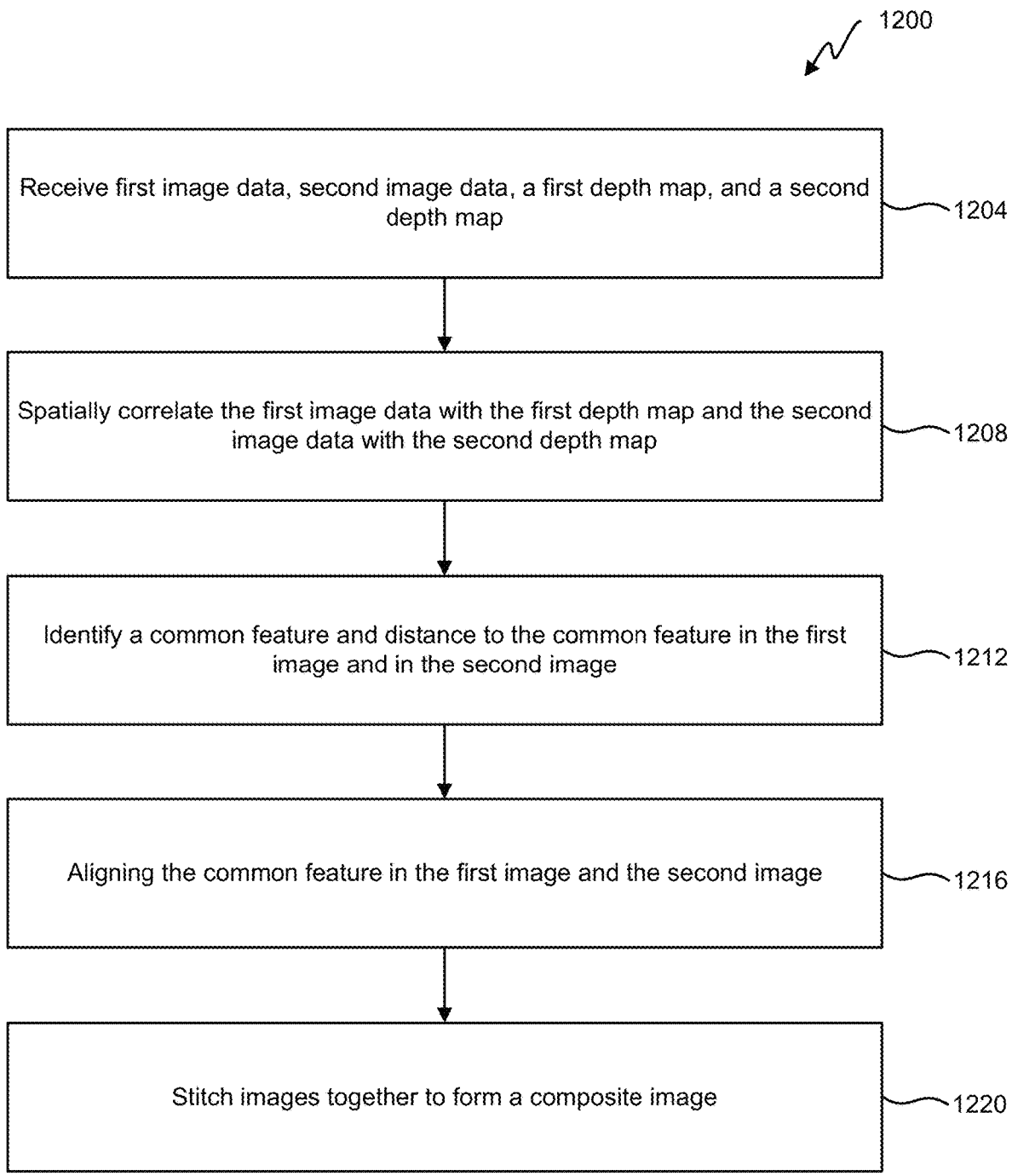
FIG. 12 illustrates an embodiment of a process of image stitching based on using a depth sensor for spatial measurements.

FIG. 12 illustrates an embodiment of a process 1200 of image stitching based on using a depth sensor for spatial measurements. Process 1200 begins in step 1204 with receiving first image data from a first image, wherein the first image is of a real scene; receiving second image data from a second image, wherein the second image is of the real scene; receiving a first depth map of the real scene, wherein data for the first depth map is acquired by a ranging system using a laser; and receiving a second depth map of the real scene, wherein data for the second depth map is acquired by the ranging system.

In step 1208, the first image data is spatially correlated with the first image map and the second image data is spatially correlated with the second depth map. In step 1212, a common feature is identified and distanced in the first image and the second image. A feature is identified in the first image; the feature is identified in the second image; a distance to the feature is ascertained in the first image using the first depth map; and a distance to the feature is ascertained in the second image using the second depth map. For example, the feature could be an item 616, or part of an item 616, in FIG. 6.

In step 1216 the feature is aligned in the first image and the second image. The first image is aligned with the second image in a projection so that the feature in the first image is collocated with the feature in the second image. The first image and/or the second image can be warped (e.g., distorted) so that in the projection the feature in the first image is a same distance from a center of the projection as the feature in the second image, thus generating warped images. In some embodiments, more than 2, 5, 10, 15, or 20 features and/or less than 10, 50, 100, or 1000 features are used for alignment and/or warping the first image and the second image.

After images are aligned and/or warped, images are stitched, step 1220. For example, two or more images are stitched to form a composite (e.g., composite image 600 in FIG. 6). In some embodiments, one or more optical patterns are detected and/or decoded in the composite image.

Figure 13:
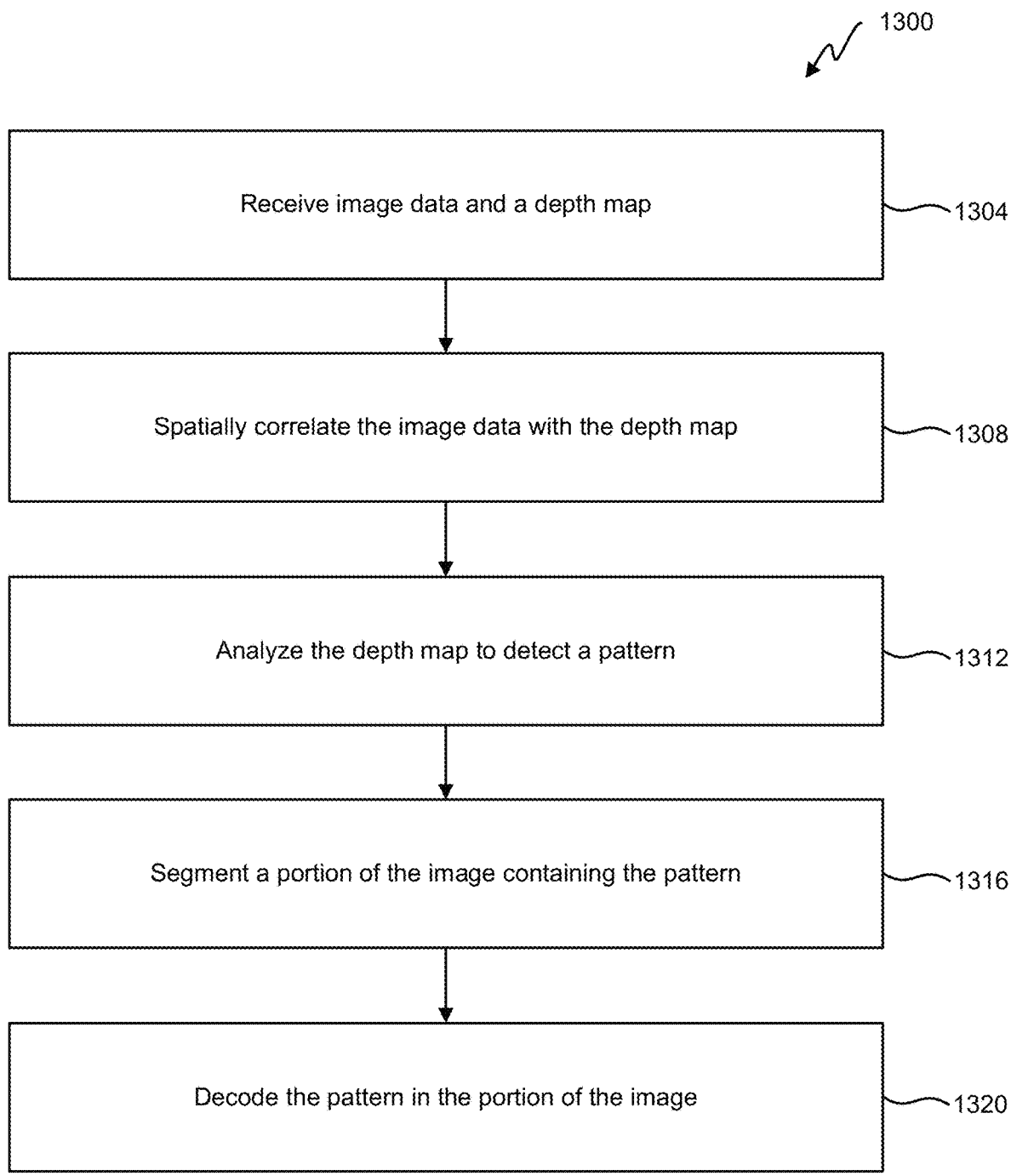
FIG. 13 illustrates an embodiment of a process for detecting an embossed optical pattern.

FIG. 13 illustrates an embodiment of a process 1300 for detecting an embossed pattern. Process 1300 begins in step 1304 with receiving image data from an image of a real scene and receiving a depth map of the real scene, wherein data for the depth map is acquired by a ranging system using a laser. In step 1308, image data is spatially correlated with the depth map.

In step 1312, the depth map is analyzed to detect a pattern (e.g., an optical pattern) in the real scene. For example, the depth map is analyzed to detect the pattern 704 in FIG. 7. In some embodiments, subtle variations of depth are used to detect a credit card number.

In step 1316, the image is segmented to contain a portion of the image containing the pattern, based on detecting the pattern using the depth map. And the pattern is decoded using the portion of the image, to obtain a data payload. In some embodiments, the pattern is a three-dimensional structure of one-dimensional or two-dimensional information. For example, depth variations in the pattern are binary.

Figure 14:
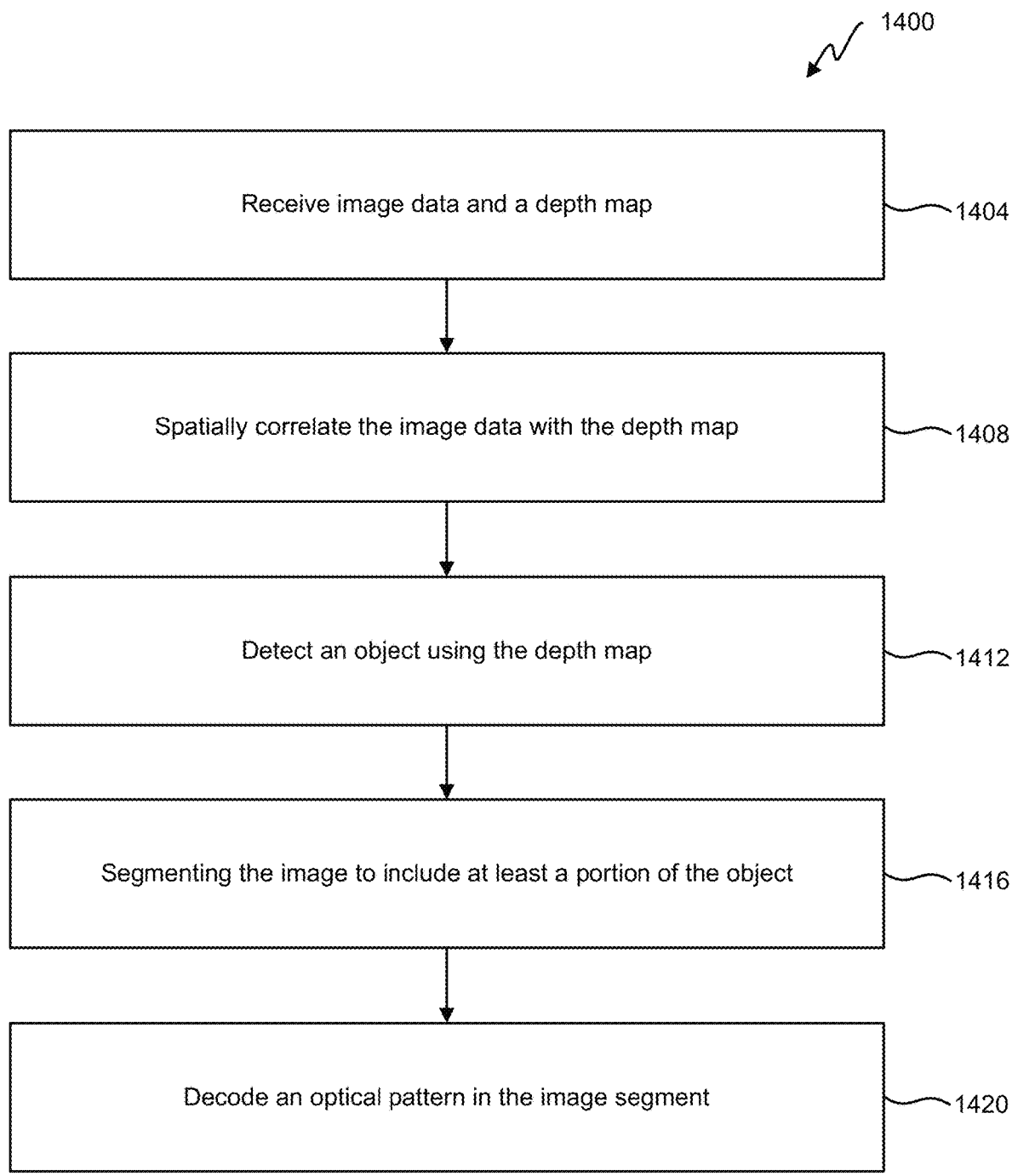
FIG. 14 illustrates an embodiment of a process of object outline extraction for detecting an optical pattern.

FIG. 14 illustrates an embodiment of a process 1400 of object outline extraction for detecting an optical pattern. Process 1400 begins in step 1404 with receiving image data from an image of a real scene and receiving a depth map of the real scene, wherein data for the depth map is acquired by a ranging system using a laser. In step 1408, the image data is spatially correlated with the depth map.

An object in the real scene is detected using the depth map, step 1412. For example, the object is detected by tracking a skeletal representation of a person, as described in conjunction with FIG. 8. In step 1416 a portion of the image is segmented, wherein the portion of the image contains at least a portion of the object. For example, the object detected is a mobile device, and/or the mobile device displays an optical pattern, such as a QR code for an airline boarding pass; and the portion of the image segmented contains the QR code and some or all of the mobile device.

In step 1620, the portion of the image is analyzed to detect the optical pattern, and/or the optical pattern is decoded in the portion of the image, to obtain a data payload.

In some embodiments, the object is a hand, and the optical pattern is displayed on a mobile device being held by the hand. The hand can be detected by tracking a skeletal representation of human posture in a plurality of preceding depth maps acquired by the ranging system, and identifying the hand from the skeletal representation (e.g., as described in conjunction with FIG. 8). In some embodiments, the object is dimensioned using data from the depth map. For example, the mobile device or boarding pass held by an airline passenger is dimensioned to confirm that the object is less than given size (e.g., less than 450, 225, or 140 $cm^2$, or less than 26, 20, or 18 cm in one dimension; and thus likely to be a boarding pass, tablet, or smartphone). In some embodiments, the object is an item for purchase, and a dimension of the object is compared to a database to confirm the item for purchase matches a dimension of an object identified by the payload data. In some embodiments, the object is a piece of luggage, and the dimensions of the object are used to estimate compliance with luggage standards (e.g., space requirements, such as overhead bin space).

F. Example Computer System

Figure 15:
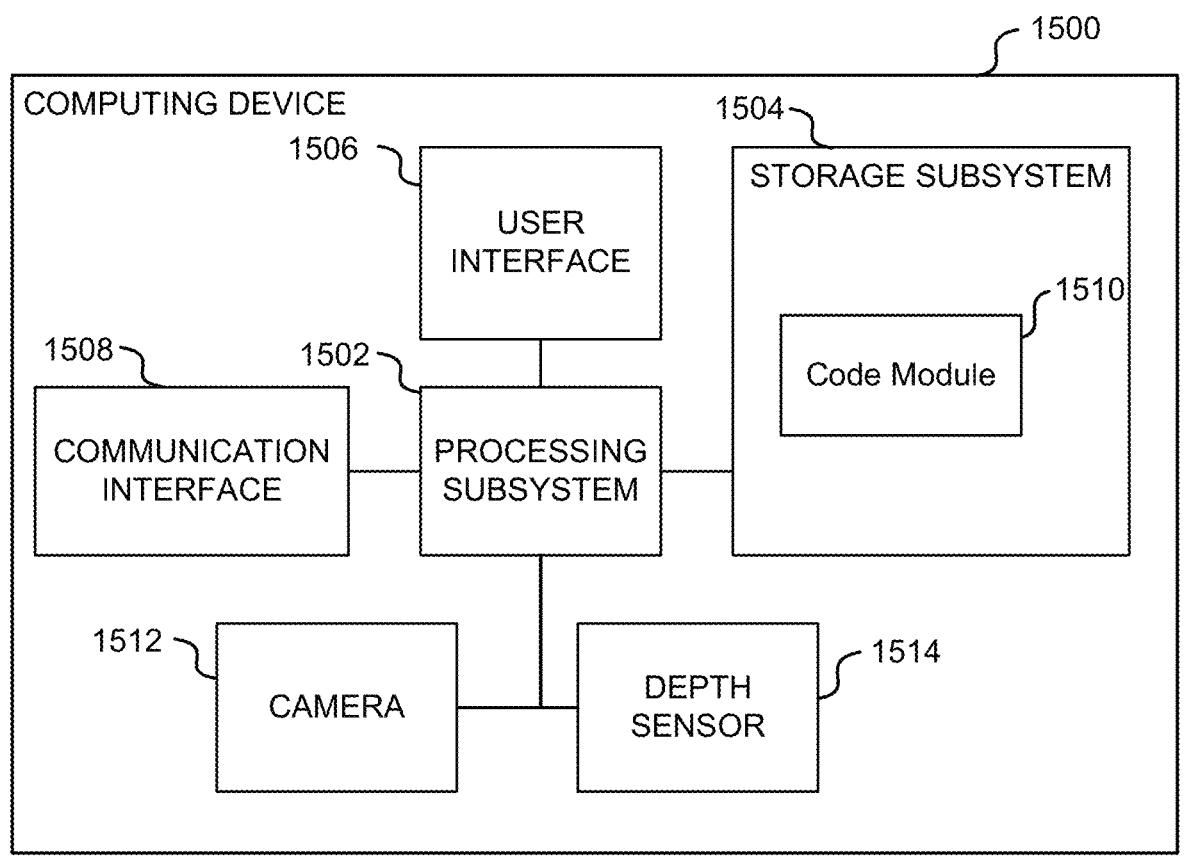
FIG. 15 illustrates an embodiment of a computer system comprising a camera and a depth sensor for detecting optical patterns.

FIG. 15 is a simplified block diagram of an embodiment of a computing device 1500 comprising a camera 1512 and a depth sensor 1514. In some embodiments, the computing device 1500 does not comprise the camera 1512 and/or the depth sensor 1514. Computing device 1500 can implement some or all functions, behaviors, and/or capabilities described above that would use electronic storage or processing, as well as other functions, behaviors, or capabilities not expressly described. Computing device 1500 includes a processing subsystem 1502, a storage subsystem 1504, a user interface 1506, and/or a communication interface 1508. Computing device 1500 can also include other components (not explicitly shown) such as a battery, power controllers, and other components operable to provide various enhanced capabilities. In various embodiments, computing device 1500 can be implemented in a desktop or laptop computer, mobile device (e.g., tablet computer, smartphone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1504 can be implemented using a local storage and/or removable storage medium, e.g., using disk, flash memory (e.g., secure digital card, universal serial bus flash drive), other non-transitory storage medium, or a combination of media and can include volatile and/or non-volatile storage media. Local storage can include random access memory (RAM), including dynamic RAM (DRAM), static RAM (SRAM), or battery backed up RAM. In some embodiments, storage subsystem 1504 can store one or more applications and/or operating system programs to be executed by processing subsystem 1502, including programs to implement some or all operations described above that would be performed using a computer. For example, storage subsystem 1504 can store one or more code modules 1510 for implementing one or more method steps described above.

A firmware and/or software implementation may be implemented with modules (e.g., procedures, functions, and so on). A machine-readable medium tangibly embodying instructions may be used in implementing methodologies described herein. Code modules 1510 (e.g., instructions stored in memory) may be implemented within a processor or external to the processor. As used herein, the term "memory" refers to a type of long term, short term, volatile, nonvolatile, or other storage medium and is not to be limited to a particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices, and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or combination thereof. When implemented in software, firmware, middleware, scripting language, and/or microcode, program code, or code segments to perform tasks may be stored in a machine-readable medium such as a storage medium. A code segment (e.g., code module 1510) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1510 may comprise sets of instructions (codes) embodied on a computer-readable medium that directs a processor of a computing device 1500 to perform corresponding actions. The instructions may be configured to run in sequential order, in parallel (such as under different processing threads), or in a combination thereof. After loading a code module 1510 on a general purpose computer system, the general purpose computer is transformed into a special purpose computer system.

Computer programs incorporating various features described herein (e.g., in one or more code modules 1510) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 1504 can also store information useful for establishing network connections using the communication interface 1508.

User interface 1506 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 1506 to invoke the functionality of computing device 1500 and can view and/or hear output from computing device 1500 via output devices of user interface 1506. For some embodiments, the user interface 1506 might not be present (e.g., for a process using an ASIC).

Processing subsystem 1502 can be implemented as one or more processors (e.g., integrated circuits, one or more single-core or multi-core microprocessors, microcontrollers, central processing unit, graphics processing unit, etc.). In operation, processing subsystem 1502 can control the operation of computing device 1500. In some embodiments, processing subsystem 1502 can execute a variety of programs in response to program code and can maintain multiple concurrently executing programs or processes. At a given time, some or all of a program code to be executed can reside in processing subsystem 1502 and/or in storage media, such as storage subsystem 1504. Through programming, processing subsystem 1502 can provide various functionality for computing device 1500. Processing subsystem 1502 can also execute other programs to control other functions of computing device 1500, including programs that may be stored in storage subsystem 1504.

Communication interface 1508 can provide voice and/or data communication capability for computing device 1500. In some embodiments, communication interface 1508 can include radio frequency (RF) transceiver components for accessing wireless data networks (e.g., Wi-Fi network; 3G, 4G/LTE; 15G, etc.), mobile communication technologies, components for short-range wireless communication (e.g., using Bluetooth communication standards, NFC, etc.), other components, or combinations of technologies. In some embodiments, communication interface 1508 can provide wired connectivity (e.g., universal serial bus, Ethernet, universal asynchronous receiver/transmitter, etc.) in addition to, or in lieu of, a wireless interface. Communication interface 1508 can be implemented using a combination of hardware (e.g., driver circuits, antennas, modulators/demodulators, encoders/decoders, and other analog and/or digital signal processing circuits) and software components. In some embodiments, communication interface 1508 can support multiple communication channels concurrently. In some embodiments the communication interface 1508 is not used.

Camera 1512 can generate images of a real-world scene including one or more optical patterns, as described in more detail in reference to FIGS. 1-13. The camera may be an integrated electronic camera forming a component of a mobile electronic device (e.g., a tablet or a smartphone). As such, the camera may be described by a framerate, an aspect ratio, and a field of view (FOV), as described in reference to the figures above. The camera 1512 may function according to one or more configurable settings including, but not limited to, exposure settings, focus routines, and/or framerate. For example, the camera 1512 may implement an autofocus routine that cycles across a range of focal positions and selects a focal position corresponding to the best focus for an optical pattern detected by the camera.

Depth sensor 1514 can generate depth information for the images captured by the camera 1512 of the computing device 1500. In some embodiments, the depth sensor 1514 can include a laser device configured to generate depth information based on the interaction of a laser beam emitted by the depth sensor 1514 (e.g., a LiDAR sensor) with objects in the environment around the computing device 1500, which the computing device 1500 can process to generate a depth map for the images of the real scene. Instead of a LiDAR sensor, a range of other depth sensors may be used in this embodiment. The depth sensor 1514 may include, but is not limited to, a sensor providing depth information to permit the computing device 1500 to generate RGB-D images, such as, sensors for determining depth information based on time of flight, stereoscopic triangulation, structured light, sheet of light, interferometry, ultrasound, coded aperture, etc.

It will be appreciated that computing device 1500 is illustrative and that variations and modifications are possible. A computing device can have various functionality not specifically described (e.g., voice communication via cellular telephone networks) and can include components appropriate to such functionality.

Further, while the computing device 1500 is described with reference to particular blocks, it is to be understood that these blocks are defined for convenience of description and are not intended to imply a particular physical arrangement of component parts. For example, the processing subsystem 1502, the storage subsystem, the user interface 1506, and/or the communication interface 1508 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments can be realized in a variety of apparatus including electronic devices implemented using a combination of circuitry and software. Electronic devices described herein can be implemented using computing device 1500.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

Having described several example configurations, various modifications, alternative constructions, and equivalents may be used without departing from the spirit of the disclosure. For example, the above elements may be components of a larger system, wherein other rules may take precedence over or otherwise modify the application of an element. Also, a number of steps may be undertaken before, during, or after the above elements are considered.

What is claimed is:

1. A system for decoding optical patterns in a real scene using perspective distortion, the system comprising:
   a camera;
   a laser-ranging system, wherein the camera and the laser-ranging system are part of a hand-held, mobile device; and
   one or more processors configured to:
      receive image data from a first image of a scene, wherein the first image is acquired by the camera;
      receive a depth map of the scene, wherein data for the depth map is acquired by the laser-ranging system;
      spatially correlate the image data with the depth map;
      identify a surface in the scene using the depth map, wherein the surface corresponds to a feature in the scene;
      distort the first image to generate a second image, using the depth map, so that the surface in the second image is parallel to an image plane of the second image; and
      analyze the second image to decode an optical pattern to obtain payload data, wherein the optical pattern is located on the surface identified in the scene.

2. The system of claim 1, wherein:
   the feature is a shelf in a retail environment; and
   the optical pattern is barcode or text on a label attached to the shelf.

3. The system of claim 1, wherein the surface in the scene is a curved surface.

4. A method for decoding optical patterns in a real scene using perspective distortion, the method comprising:
   receiving image data from a first image of a scene, wherein:
      the first image is acquired by a camera; and
      the camera is part of a hand-held mobile device;
   receiving a depth map of the scene;
   spatially correlating the image data with the depth map;
   identifying a surface in the scene using the depth map, wherein the surface corresponds to a feature in the scene;
   distorting the first image to generate a second image, so that the surface in the second image is parallel to an image plane of the second image; and
   analyzing the second image to decode an optical pattern to obtain payload data, wherein the optical pattern is located on the surface identified in the scene.

5. The method of claim 4, wherein:
   the feature is a shelf in a retail environment; and
   the optical pattern is on a label attached to the shelf.

6. The method of claim 4, wherein the surface is a plane.

7. The method of claim 4, wherein the surface is a curved surface.

8. The method of claim 4, wherein the method further comprises de-blurring the surface in the second image using the depth map.

9. The method of claim 4, wherein the method further comprises using the depth map of the surface to calculate a homography perspective of the camera with respect to the surface, while the camera acquired the first image.

10. The method of claim 4, wherein data for the depth map is acquired by a ranging system using a laser, and the ranging system is part of the hand-held mobile device.

11. The method of claim 4, wherein the optical pattern comprises text.

12. The method of claim 4, wherein the optical pattern is a first optical pattern; and
the method further comprises decoding a second optical pattern in the second image.

13. The method of claim 4, wherein:
the image data and data for the depth map are received at a remote server; and
distorting the first image to generate the second image is performed at the remote server.

14. One or more memory devices containing instructions that, when executed, cause one or more processors to perform the following steps:
receiving image data from a first image of a scene, wherein the first image is acquired by a camera, wherein the camera is part of a hand-held mobile device;
receiving a depth map of the scene;
spatially correlating the image data with the depth map;
identifying a surface in the scene using the depth map, wherein the surface corresponds to a feature in the scene;
distorting the first image to generate a second image, so that the surface in the second image is parallel to an image plane of the second image; and
analyzing the second image to decode an optical pattern to obtain payload data, wherein the optical pattern is located on the surface identified in the scene.

15. The one or more memory devices of claim 14, wherein the instructions further cause the one or more processors to down sample the first image to obtain the image data.

16. The one or more memory devices of claim 14, wherein:
the image data and data for the depth map are received at a remote server; and
distorting the first image to generate the second image is performed at the remote server.

17. The one or more memory devices of claim 14, wherein:
the feature is a shelf in a retail environment; and
the optical pattern is barcode or text on a label attached to the shelf.

18. The one or more memory devices of claim 14, wherein the instructions further cause the one or more processors to use data for the depth map of the surface to calculate a homography perspective of the camera with respect to the surface, while the camera acquired the first image.

19. The one or more memory devices of claim 14, wherein the surface is a plane.

20. The one or more memory devices of claim 14, wherein the instructions further cause the one or more processors to de-blur the surface in the second image using the depth map.

* * * * *